US012775926B2

(12) United States Patent
Fehrenbach

(10) Patent No.: US 12,775,926 B2
(45) Date of Patent: Oct. 27, 2026

(54) VARIABLE CARD FEE POINT-OF-SALE SYSTEM

(71) Applicant: Wells Fargo Bank, N.A., San Francisco, CA (US)

(72) Inventor: Frank Fehrenbach, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 46 days.

(21) Appl. No.: 18/231,432

(22) Filed: Aug. 8, 2023

(65) Prior Publication Data

US 2025/0053943 A1 Feb. 13, 2025

(51) Int. Cl.
*G06Q 20/20* (2012.01)
*G06Q 20/40* (2012.01)

(52) U.S. Cl.
CPC ....... *G06Q 20/204* (2013.01); *G06Q 20/4014* (2013.01)

(58) Field of Classification Search
CPC ......................... G06Q 20/204; G06Q 20/4014
See application file for complete search history.

(56) References Cited

U.S. PATENT DOCUMENTS 9,569,797 B1 2/2017 Rohn et al.
9,710,852 B1 7/2017 Olson et al.
9,870,589 B1 1/2018 Arnold et al.
10,089,646 B1 10/2018 Mohsenzadeh
10,269,065 B1 4/2019 Kapczynski et al.
11,100,573 B1 8/2021 Chu et al.
(Continued)

FOREIGN PATENT DOCUMENTS

AU 2015200001 A1 7/2015
CA 2527538 A1 5/2007
(Continued)

OTHER PUBLICATIONS

Hayashi et al., "Effects of Credit Scores on Consumer Payment Choice," 2012, Reference U, The Federal Reserve Bank of Kansas City Research Working Papers.
(Continued)

*Primary Examiner* — Allen C Chein
(74) *Attorney, Agent, or Firm* — Foley & Lardner LLP

(57) ABSTRACT

A computing system is configured to receive an indication of a customer transaction associated with a customer, retrieve, in response to receiving the indication of the customer transaction and prior to receiving a payment method from the customer for the customer transaction, transaction rates associated with a plurality of potential payment methods, determine a plurality of potential transaction amounts corresponding to the plurality of potential payment methods based on the transaction rates, generate display data including a plurality of payment options, each payment option including an indication of a potential payment method of the plurality of potential payment methods and a potential transaction amount of the plurality of potential transaction amounts corresponding to the potential payment method, and cause a graphical user interface based on the display data to be displayed to the customer.

18 Claims, 7 Drawing Sheets

(56) References Cited

U.S. PATENT DOCUMENTS

| | | | |
|---|---|---|---|
| 11,900,451 B1 | 2/2024 | King et al. | |
| 2005/0065848 A1 | 3/2005 | Mitchell et al. | |
| 2009/0299820 A1 | 12/2009 | Wang et al. | |
| 2010/0145857 A1 | 6/2010 | Davila et al. | |
| 2011/0101091 A1 | 5/2011 | Fernandez | |
| 2012/0101882 A1* | 4/2012 | Todd | G06Q 20/3572 235/379 |
| 2012/0259716 A1 | 10/2012 | Rosenberger | |
| 2014/0006253 A1 | 1/2014 | Nuzzi et al. | |
| 2014/0188643 A1 | 7/2014 | Murphy | |
| 2014/0279524 A1 | 9/2014 | Slusser et al. | |
| 2015/0046273 A1 | 2/2015 | Vaughan | |
| 2015/0170182 A1* | 6/2015 | Perez | G06Q 30/0226 705/14.27 |
| 2016/0225011 A1 | 8/2016 | Shah et al. | |
| 2017/0004481 A1* | 1/2017 | Slusser | G06Q 20/12 |
| 2017/0032460 A1 | 2/2017 | Szollar | |
| 2017/0193597 A1 | 7/2017 | Cai et al. | |
| 2019/0147708 A1 | 5/2019 | Monaco et al. | |
| 2020/0175516 A1 | 6/2020 | Trim et al. | |
| 2022/0084024 A1* | 3/2022 | Mossoba | G06Q 20/389 |
| 2022/0215467 A1 | 7/2022 | Virk et al. | |
| 2022/0383406 A1 | 12/2022 | Anasta et al. | |
| 2022/0398585 A1 | 12/2022 | Anderson | |
| 2025/0037107 A1 | 1/2025 | Abdelrahman et al. | |

FOREIGN PATENT DOCUMENTS

| | | | |
|---|---|---|---|
| CA | 3023325 | A1 | 5/2019 |
| CA | 3095309 | A1 | 3/2022 |
| CN | 110717823 | B | 8/2022 |
| WO | WO-2022/240857 | A1 | 11/2022 |

OTHER PUBLICATIONS

Lowe's Advantage Card, Lowe's, https://web.archive.org/Web/20230206235438/https://WWW.lowes.com/l/Credit/consumer-credit-center, (Year: 2023).

ClarityVenturesVideo, "Clarity Payment Hub Interpayments Solution—Process Credit Card & Invoice Payments from any ERP", Dec. 2021, available at https://www.youtube.com/watch?v=nuLyCIQII8w.

* cited by examiner

VARIABLE CARD FEE POINT-OF-SALE SYSTEM

TECHNICAL FIELD

Aspects and embodiments of the present disclosure relate to systems and methods for providing transaction rate transparency to a variety of entities involved in completing transactions.

BACKGROUND

Traditional customer transactions include a variety of hidden or otherwise non-transparent fees. Due to these hidden or otherwise non-transparent fees, when a customer pays, for example, $100 for a purchase of goods or services, the merchant or service provider does not ultimately receive $100. Instead, the merchant or service provider receives less than the full $100 due to a variety of fees including interchange fees that are assessed on the transaction. Because differing payment cards have differing fees and interchange rates, merchants and service providers are typically unable to accurately predict the revenue generated by transactions in real-time. Given this general lack of transparency, some merchants and service providers preemptively charge additional fees for credit transactions that typically have higher interchange rates. However, this preemptive charging does not address the underlying lack of transparency and does not provide any benefit to the customer.

SUMMARY

One embodiment relates to a computing system. The computing system includes one or more processing circuits including one or more processors coupled to one or more memory devices, the one or more memory devices having instructions stored thereon that, when executed by the one or more processors, cause the one or more processors to receive an indication of a customer transaction associated with a customer. The instructions, when executed by the one or more processors, further cause the one or more processors to, in response to receiving the indication of the customer transaction and prior to receiving a payment method from the customer for the customer transaction, retrieve transaction rates associated with a plurality of potential payment methods. The instructions, when executed by the one or more processors, further cause the one or more processors to determine a plurality of potential transaction amounts corresponding to the plurality of potential payment methods based on the transaction rates. The instructions, when executed by the one or more processors, further cause the one or more processors to generate a graphical user interface including a plurality of payment options, each payment option including an indication of a potential payment method of the plurality of potential payment methods and a potential transaction amount of the plurality of potential transaction amounts corresponding to the potential payment method. The instructions, when executed by the one or more processors, further cause the one or more processors to cause the graphical user interface to be displayed to the customer.

Another embodiment relates to a method. The method includes receiving an indication of a customer transaction associated with a customer. The method further includes, in response to receiving the indication of the customer transaction and prior to receiving a payment method from the customer for the customer transaction, retrieving transaction rates associated with a plurality of potential payment methods. The method further includes determining a plurality of potential transaction amounts corresponding to the plurality of potential payment methods based on the transaction rates. The method further includes generating a graphical user interface including a plurality of payment options, each payment option including an indication of a potential payment method of the plurality of potential payment methods and a potential transaction amount of the plurality of potential transaction amounts corresponding to the potential payment method. The method further includes causing the graphical user interface to be displayed to the customer.

Still another embodiment relates to a non-transitory computer-readable medium having instructions stored thereon that, when executed by at least one processing circuit of a computing system, cause operations including receiving an indication of a customer transaction associated with a customer. The operations further include, in response to receiving the indication of the customer transaction and prior to receiving a payment method from the customer for the customer transaction, retrieving transaction rates associated with a plurality of potential payment methods. The operations further include determining a plurality of potential transaction amounts corresponding to the plurality of potential payment methods based on the transaction rates. The operations further include generating a graphical user interface including a plurality of payment options, each payment option including an indication of a potential payment method of the plurality of potential payment methods and a potential transaction amount of the plurality of potential transaction amounts corresponding to the potential payment method. The operations further include causing the graphical user interface to be displayed to the customer.

Another embodiment relates to a merchant computing system associated with a merchant. The merchant computing system includes one or more processors coupled to one or more memory devices, the one or more memory devices having instructions stored thereon that, when executed by the one or more processors, cause the one or more processors to receive a plurality of transaction rates corresponding to a plurality of potential payment methods. The instructions further cause the one or more processors to display the plurality of transaction rates via a merchant user device. The instructions further cause the one or more processors to receive a transaction offer from the merchant user device. The instructions further cause the one or more processors to generate display data including a plurality of payment options corresponding to the plurality of potential payment methods and the transaction offer. The instructions further cause the one or more processors to cause a graphical user interface based on the display data to be displayed to a customer.

In some embodiments, the merchant is one of a physical store retailer or an online retailer. In some embodiments, the transaction offer is a discount percentage for using a first potential payment method of the plurality of potential payment methods. In some of these embodiments, the transaction rate for each potential payment method of the plurality of potential payment methods comprises a percentage-based fee applied to the potential payment method by one or more of a card-issuing financial institution, a payment network provider, or a transaction processing entity. In some of these embodiments, a first percentage-based fee applied to the first potential payment method is lower than a second percentage-based fee applied to a second potential payment method, and wherein the discount percentage is higher than the first percentage-based fee and lower than the second percentage-based fee. In some embodiments, the transaction offer is a discount percentage for using an existing merchant payment card provided by the merchant. In some embodiments, the transaction offer is an introductory discount percentage for a transaction if a new merchant payment card is opened by the customer.

Still another embodiment relates to a method. The method includes receiving, by a merchant computing system associated with a merchant, a plurality of transaction rates corresponding to a plurality of potential payment methods. The method further includes displaying, by the merchant computing system, the plurality of transaction rates via a merchant user device. The method further includes receiving, by the merchant computing system, a transaction offer from the merchant user device. The method further includes generating, by the merchant computing system, a display data including a plurality of payment options corresponding to the plurality of potential payment methods and the transaction offer. The method further includes causing, by the merchant computing system, a graphical user interface based on the display data to be displayed to a customer.

In some embodiments, the method further includes receiving, by the merchant computing system, a time period during which the transaction offer is valid from the merchant user device. In some embodiments, the method further includes detecting, by the merchant computing system, a customer device associated with the customer proximate a point-of-sale location associated with the merchant and transmitting, by the merchant computing system, a notification to the customer device including the transaction offer. In some of these embodiments, detecting the customer device is performed using one or more of a Wi-Fi connectivity detection, a Bluetooth signal, or a short-range communication signal. In some embodiments, the transaction offer is a tiered discount percentage offer comprising a discount percentage selected based on a purchase amount associated with a transaction. In some embodiments, the transaction offer is a financing option provided by the merchant. In some of these embodiments, the financing option includes a payback interest rate selected based on a purchase amount associated with a transaction.

Another embodiment relates to a non-transitory computer-readable medium having instructions stored thereon that, when executed by at least one or more processors of a merchant computing system associated with a merchant, cause operations including receiving a plurality of transaction rates corresponding to a plurality of potential payment methods. The operations further include displaying the plurality of transaction rates via a merchant user device. The operations further include receiving a transaction offer from the merchant user device. The operations further include generating display data including a plurality of payment options corresponding to the plurality of potential payment methods and the transaction offer. The operations further include causing a graphical user interface based on the display data to be displayed to a customer.

In some embodiments, the transaction offer is a discount percentage for using a first potential payment method of the plurality of potential payment methods. In some of these embodiments, the transaction rate for each potential payment method of the plurality of potential payment methods comprises a percentage-based fee applied to the potential payment method by one or more of a card-issuing financial institution, a payment network provider, or a transaction processing entity. In some of these embodiments, a first percentage-based fee applied to the first potential payment method is lower than a second percentage-based fee applied to a second potential payment method, and wherein the discount percentage is higher than the first percentage-based fee and lower than the second percentage-based fee. In some embodiments, the operations further includes detecting a customer device associated with the customer proximate a point-of-sale location associated with the merchant and transmitting a notification to the customer device including the transaction offer. In some of these embodiments, detecting the customer device is performed using one or more of a Wi-Fi connectivity detection, a Bluetooth signal, or a short-range communication signal.

Still another embodiment relates to a provider computing system associated with a provider. The provider computing system includes one or more processors coupled to one or more memory devices, the one or more memory devices having instructions stored thereon that, when executed by the one or more processors, cause the one or more processors to receive transaction information regarding a customer transaction associated with one or more of a transaction processing entity, a merchant, or a payment network provider, the transaction information including a potential payment method. The instructions further cause the one or more processors to determine a transaction rate associated with the potential payment method. The instructions further cause the one or more processors to identify an offer associated with the one or more of the transaction processing entity, the merchant, or the payment network provider. The instructions further cause the one or more processors to generate display data including the transaction rate and the offer. The instructions further cause the one or more processors to transmit the display data to at least one of a transaction processing device associated with the transaction processing entity, a merchant computing system associated with the merchant, or a customer device associated with a customer, the display data configured to cause the transaction rate and the offer to be displayed by the at least one of the transaction processing device, the merchant computing system, or the customer device.

In some embodiments, the display data is transmitted to one of the transaction processing device or the merchant computing system, and receiving the transaction information regarding the customer transaction is performed as part of an application programming interface (API) interaction between the provider computing system and the one of the transaction processing device or the merchant computing system. In some embodiments, the instructions further cause the one or more processors to provide an application to the customer device, and wherein the display data is transmitted to the customer device via the application. In some embodiments, the instructions further cause the one or more processors to retrieve, in response to receiving the transaction information, the transaction rate from one or more third-party computing systems associated with one or more of a second provider, the merchant, the transaction processing entity, or the payment network provider, wherein the transaction rate comprises one of more of an interchange rate associated with the potential payment method, an interest rate associated with the potential payment method, or a rewards rate associated with the potential payment method. In some of these embodiments, retrieving the transaction rate is performed in real-time.

In some embodiments, the instructions further cause the one or more processors to receive a registration request from the one or more of the transaction processing entity, the merchant, or the payment network provider, the registration request being associated with a payment method incentive program; register the one or more of the transaction processing entity, the merchant, or the payment network provider for the payment method incentive program by creating and storing a registered account corresponding to the one or more of the transaction processing entity, the merchant, or the payment network provider; receive the offer from the one or more of the transaction processing entity, the merchant, or the payment network provider, the offer incentivizing the customer to utilize a specific payment method to complete customer transactions; and store the offer in the registered account. In some embodiments, the instructions further cause the one or more processors to provide a payment method incentive application to at least one of the transaction processing device or the merchant computing system based on registering the at least one of the transaction processing entity or the merchant for the payment method incentive program, and wherein the display data is transmitted to the one of the transaction processing device or the merchant computing system via the payment method incentive application.

Another embodiment relates to a method. The method includes receiving, by a provider computing system associated with a provider, transaction information regarding a customer transaction associated with one or more of a transaction processing entity, a merchant, or a payment network provider, the transaction information including a potential payment method. The method further includes determining, by the provider computing system, a transaction rate associated with the potential payment method. The method further includes identifying, by the provider computing system, an offer associated with the one or more of the transaction processing entity, the merchant, or the payment network provider. The method further includes generating, by the provider computing system, display data including the transaction rate and the offer. The method further includes transmitting, by the provider computing system, the display data to at least one of a transaction processing device associated with the transaction processing entity, a merchant computing system associated with the merchant, or a customer device associated with a customer.

In some embodiments, the display data is transmitted to one of the transaction processing device or the merchant computing system, and receiving the transaction information regarding the customer transaction is performed as part of an application programming interface (API) interaction between the provider computing system and the one of the transaction processing device or the merchant computing system. In some embodiments, the method further includes providing, by the provider computing system, an application to the customer device, and wherein the display data is transmitted to the customer device via the application. In some embodiments, the method further includes retrieving, in response to receiving the transaction information, by the provider computing system, the transaction rate from one or more third-party computing systems associated with one or more of a second provider, the merchant, the transaction processing entity, or the payment network provider, wherein the transaction rate comprises one of more of an interchange rate associated with the potential payment method, an interest rate associated with the potential payment method, or a rewards rate associated with the potential payment method. In some of these embodiments, retrieving the transaction rate is performed in real-time.

In some embodiments, the method further includes receiving, by the provider computing system, a registration request from the one or more of the transaction processing entity, the merchant, or the payment network provider, the registration request being associated with a payment method incentive program; registering, by the provider computing system, the one or more of the transaction processing entity, the merchant, or the payment network provider for the payment method incentive program by creating and storing a registered account corresponding to the one or more of the transaction processing entity, the merchant, or the payment network provider; receiving, by the provider computing system, the offer from the one or more of the transaction processing entity, the merchant, or the payment network provider, the offer incentivizing the customer to utilize a specific payment method to complete customer transactions; and storing, by the provider computing system, the offer in the registered account. In some of these embodiments, the method further includes providing, by the provider computing system, a payment method incentive application to at least one of the transaction processing device or the merchant computing system based on registering the at least one of the transaction processing entity or the merchant for the payment method incentive program, and wherein the display data is transmitted to the one of the transaction processing device or the merchant computing system via the payment method incentive application. In some of these embodiments, the transaction information is received prior to the customer providing a payment method for completing the customer transaction based on the merchant being registered for the payment method incentive program. In some of these embodiments, the transaction information is received prior to the customer providing a payment method for completing the customer transaction based on the transaction processing entity being registered for the payment method incentive program.

In some embodiments, the display data is configured to be presented to the customer via one of more of a personal computing device, a self-checkout device, or the transaction processing device. In some embodiments, the transaction information is received after the customer has provided the potential payment method for completion of the customer transaction, and wherein the display data is transmitted to the at least one of the transaction processing device, the merchant computing system, or the customer device responsive to receiving the transaction information and prior to completing the customer transaction using the potential payment method.

Still another embodiment relates to a non-transitory computer-readable medium having instructions stored thereon that, when executed by at least one processing circuit of a provider computing system associated with a provider, cause operations including receiving transaction information regarding a customer transaction associated with one or more of a transaction processing entity, a merchant, or a payment network provider, the transaction information including a potential payment method. The operations further include determining a transaction rate associated with the potential payment method. The operations further include identifying an offer associated with the one or more of the transaction processing entity, the merchant, or the payment network provider. The operations further include generating display data including the transaction rate and the offer. The operations further include transmitting the display data to at least one of a transaction processing device associated with the transaction processing entity, a merchant computing system associated with the merchant, or a customer device associated with a customer.

In some embodiments, the operations further include receiving a registration request from the one or more of the transaction processing entity, the merchant, or the payment network provider, the registration request being associated with a payment method incentive program; registering the one or more of the transaction processing entity, the merchant, or the payment network provider for the payment method incentive program by creating and storing a registered account corresponding to the one or more of the transaction processing entity, the merchant, or the payment network provider; receiving the offer from the one or more of the transaction processing entity, the merchant, or the payment network provider, the offer incentivizing the customer to utilize a specific payment method to complete customer transactions; and storing the offer in the registered account.

This summary is illustrative only and is not intended to be in any way limiting. Other aspects, inventive features, and advantages of the systems, devices, or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
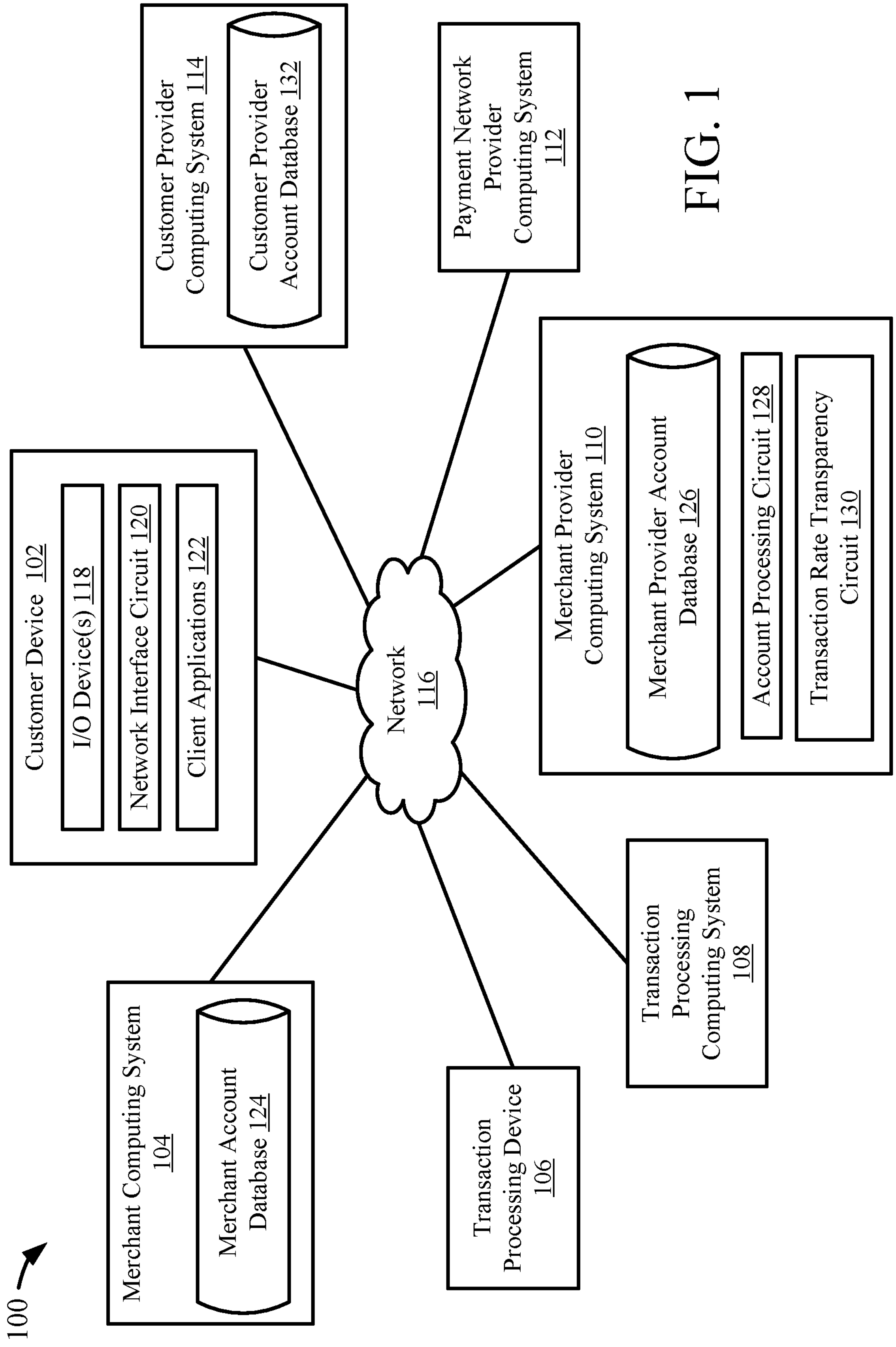
FIG. 1 is a block diagram of a computing environment that enables transaction rate transparency, according to an example embodiment.

Referring generally to the figures, systems and methods for providing transaction rate transparency between merchants and customers are disclosed according to various embodiments herein. In some instances, the systems and methods described herein provide transaction rate transparency by communicating in real-time with various entities involved in facilitating or otherwise processing customer transactions. Beneficially, the systems and methods described herein allow customers to evaluate various transaction information pertaining to different payment methods (e.g., cash, debit cards, credit cards, prepaid cards, PayPal®, Apple Pay®) they have in their possession and may use to complete a customer transaction. Further, various registered entities (e.g., merchants, transaction processing entities, payment network provider entities, and/or provider institutions) are enabled to offer various discounts for select payment methods during various customer transactions, thereby enabling the registered entities to promote different payment methods used by the customers.

In some instances, the system and methods described herein create a real-time feedback system during a customer transaction checkout experience that presents various payment options and corresponding payment option information (e.g., associated fees, discount offers, rewards, real-time balances, real-time interest rates) to the customer. Similarly, the merchant may access various transaction rate information and provide various discount offers on specific payment methods to incentivize customers to complete customer transactions using the specific payment methods. By providing the payment option and transaction rate information to the customer and merchant on a real-time basis, the customer may be more informed regarding their payment method decision and the merchant may more accurately capture fees assessed on various customer transactions.

Accordingly, the systems and methods described herein provide a variety of improvements to transaction systems. For example, traditional transaction systems have not been configured to provide merchants or customers with real-time interchange rate information pertaining to potential payment methods during and/or prior to completion of customer transactions. As such, merchants have been unable to accurately track profitability of customer transactions in real-time because the interchange fee applied to each customer transaction is unknown and may be different depending on the payment method used. Further, merchants have been unable to provide customer discount offers that accurately counteract these interchange fees in real-time or near real-time. However, the systems and methods described herein solve these issues by providing merchants with the real-time interchange rate information associated with customer payment methods and allowing merchants to offer discount offers for different payment methods to counteract or otherwise offset the interchange fees.

For example, if the merchant knows that an interchange rate on a credit card associated with a customer making a purchase is a 3% fee, the merchant can offer, in real-time or near real-time, the customer a discount offer of 1.5% off of the purchase price for paying with cash or a debit card instead. In this case, the customer ultimately pays 1.5% less than the purchase price, and the merchant ultimately receives 98.5% of the purchase price instead of the 97% of the purchase price they would have received had the customer used the credit card, thereby benefiting both the merchant and the customer.

Additionally, traditional transaction systems have not been configured to provide customers with real-time interest rates, discount offers, rewards rates, and account balances prior to and/or during a customer transaction. The systems and methods described herein provide this unique combination of information, pulled from a variety of disparate systems (e.g., multiple financial institutions, payment network providers, transaction service providers, merchants), to customers in real-time prior to and/or during customer transactions, thereby reducing the likelihood of the customers inadvertently over-drafting (e.g., by providing the real-time account balances) and allowing customers to make better-informed decisions regarding their payment method choices.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a diagram of a computing environment 100 that enables transaction rate transparency associated with a variety of customer transactions. As shown, the computing environment 100 includes a customer device 102, a merchant computing system 104, a transaction processing device 106, a transaction processing computing system 108, a merchant provider computing system 110, a payment network provider computing system 112, and a customer provider computing system 114. The various components of the computing environment are in communication with each other and are connected by a network 116.

Although the various systems and devices are shown in FIG. 1 as being singular, it will be understood that, in some instances, the computing environment 100 may include one or multiple of any of the various illustrated systems and/or devices, as desired for a given application. Similarly, while the following descriptions of the various systems and devices are largely provided in terms of single systems or devices, it will be appreciated that these descriptions are similarly applicable to any additional corresponding systems and/or devices (e.g., additional merchant computing systems 104, additional customer devices 102, and so on).

The customer device 102 is owned, operated, controlled, managed, and/or otherwise associated with a customer (e.g., a customer making a purchase at a merchant associated with the merchant computing system 104). In some embodiments, the customer device 102 may be or may comprise, for example, a desktop or laptop computer (e.g., a tablet computer), a smartphone, a wearable device (e.g., a smartwatch), a personal digital assistant, and/or any other suitable computing device. In the examples shown in FIGS. 6 and 7, the customer device 102 is structured as a mobile computing device, such as a smartphone.

Figure 2:
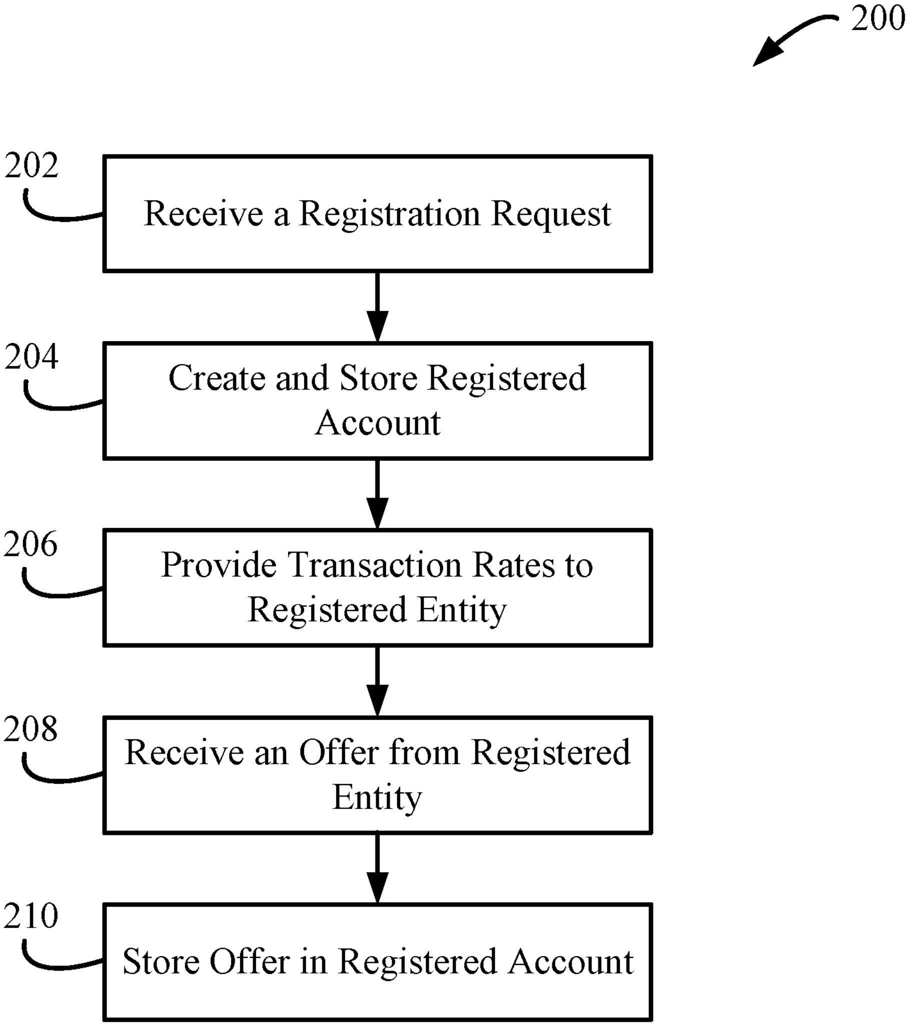
FIG. 2 is flow diagram of a method for registering for a payment method incentive program, according to an example embodiment.

As shown in FIG. 2, in some embodiments, the customer device 102 includes one or more I/O devices 118, a network interface circuit 120, and one or more client applications 122. While the term "I/O" is used, it should be understood that the I/O devices 118 may be input-only devices, output-only devices, and/or a combination of input and output devices. In some instances, the I/O devices 118 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 118 further comprise one or more user interfaces (devices or components that interface with the customer), which may include one or more biometric sensors (such as a fingerprint reader, a heart monitor that detects cardiovascular signals, face scanner, an iris scanner, etc.).

The network interface circuit 120 includes, for example, program logic and various devices (e.g., transceivers, etc.) that connect the customer device 102 to the network 116. The network interface circuit 120 facilitates secure communications between the customer device 102 and various other components of the computing environment 100. The network interface circuit 120 also facilitates communication with other entities, such as other banks, settlement systems, and so on.

In some instances, the customer device 102 stores in computer memory, and executes ("runs") using one or more processors, various client applications 122, such as an Internet browser presenting websites and/or applications provided or authorized by entities implementing or administering any of the computing systems in computing environment 100 to enable the customer to perform or otherwise interact with various methods and operations described herein.

For example, in some instances, the client applications 122 comprise a customer provider client application (e.g., a financial institution banking application) provided by and at least partly supported by either the merchant provider computing system 110 or the customer provider computing system 114. In some instances, the client applications 122 may comprise a merchant client application provided by and at least partly supported by the merchant computing system 104.

In some instances, the client application 122 may additionally be coupled to various components within the computing environment 100 (e.g., the merchant computing system 104, the merchant provider computing system 110, the customer provider computing system 114) via one or more application programming interfaces (APIs) and/or software development kits (SDKs) to integrate one or more features or services provided by the various components to enable the various methods and operations described herein.

With reference again to FIG. 1, the merchant computing system 104 is controlled by, managed by, owned by, and/or otherwise associated with a merchant or service provider, such as a point-of-sale merchant or service provider (e.g., a physical retail store, a physical service provider location) or an online merchant or service provider (e.g., an online retailer, an online service provider). Accordingly, as used herein, the term "merchant" may refer to a physical or online, commercial or individual seller of goods, services, and/or any other tangible or intangible articles of commerce. In some embodiments, the merchant computing system 104 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures. In some instances, the merchant computing system 104 may comprise and/or have various other devices communicably coupled thereto, such as, for example, desktop or laptop computers (e.g., tablet computers), smartphones, wearable devices (e.g., smartwatches), and/or other suitable devices.

As shown in FIG. 1, the merchant computing system 104 includes a merchant account database 124. In some instances, the merchant account database 124 stores various customer account information, customer preferences, customer account access credentials, customer payment method history, and various customer identifying information. In some instances, the merchant computing system 104 may be configured to retrieve and transmit various customer data stored within the merchant account database 124 to various components within the computing environment 100 to enable the various methods, functions, and processes described herein.

Although not specifically shown, it will be appreciated that the merchant computing system 104 may similarly include various I/O devices (e.g., similar to I/O device(s) 118), a network interface circuit (e.g., similar to the network interface circuit 120), client applications (e.g., similar to client applications 122), additional databases, an account processing circuit (e.g., similar to the account processing circuit 128 of the merchant provider computing system 110), and other circuits in the same or similar manner to the other components of computing environment 100. For example, in some instances, the merchant computing system 104 may include a network interface circuit having user interface program logic configured to generate and present application pages, web pages, and/or various other data to users accessing the merchant computing system 104 over the network 116.

In some instances, the transaction processing device 106 is owned, operated, controlled, managed, and/or otherwise associated with a transaction processing entity (e.g., Clover®, Square®) configured to process a variety of transactions (e.g., debit card transactions, credit card transactions, tap-to-pay transactions using a mobile device). For example, in some instances, the transaction processing entity may provide the transaction processing device 106 (and other similar transaction processing devices) to various merchants to allow the merchants to conduct card-based transactions. In these instances, the transaction processing device 106 may be or may comprise a card terminal device configured to receive swipes, dips, and/or taps from various payment cards and/or other payment devices (e.g., a mobile wallet device with tap-to-pay functionality).

In some instances, a variety of different devices may be configured for use as the transaction processing device 106. For example, in some instances, a transaction processing application may be provided by the transaction processing entity (e.g., via the transaction processing computing system 108) to a variety of devices to allow for the devices to perform the transaction processing functionality of the transaction processing device 106. For example, in some instances, any of a desktop or laptop computer (e.g., a tablet computer), a smartphone, a wearable device (e.g., a smartwatch), a personal digital assistant, and/or any other suitable computing device may be configured for use as the transaction processing device 106, as desired for a given application. Accordingly, in some instances, the transaction processing device 106 may be owned, operated, controlled, managed, and/or otherwise associated with the merchant and/or various other entities.

Although not specifically shown, it will be appreciated that the transaction processing device 106 may similarly include various I/O devices (e.g., similar to I/O device(s) 118), a network interface circuit (e.g., similar to the network interface circuit 120), client applications (e.g., similar to client applications 122), and other circuits in the same or similar manner to the other components of computing environment 100.

The transaction processing device 106 is communicably coupled with the transaction processing computing system 108, which is similarly owned, operated, controlled, managed, and/or otherwise associated with the transaction processing entity. For example, in some instances, the transaction processing device 106 is configured to transmit various transaction information from the point of sale to the transaction processing computing system 108 to be used to process various payments conducted at the merchant.

As an example of a traditional payment processing operation, in some instances, a customer may swipe a payment card using the transaction processing device 106 at the merchant point-of-sale location to pay for a purchase. The transaction processing device 106 may then transmit various transaction information (e.g., the payment card information, purchase pricing) to the transaction processing computing system 108. The transaction processing computing system 108 may then transmit the payment card information to the merchant's financial institution (e.g., the merchant provider computing system 110), which then communicates with the customer's financial institution (e.g., the customer provider computing system 114) over an established payment network (e.g., provided by the payment network provider computing system 112) to authorize and complete the payment for the purchase.

Although not specifically shown, it will be appreciated that the transaction processing device 106 and/or the transaction processing computing system 108 may each similarly include various I/O devices (e.g., similar to I/O device(s) 118), a network interface circuit (e.g., similar to the network interface circuit 120), client applications (e.g., similar to client applications 122), and other circuits in the same or similar manner to the other components of computing environment 100. For example, in some instances, the transaction processing computing system 108 may include a network interface circuit having user interface program logic configured to generate and present application pages, web pages, and/or various other data to users accessing the transaction processing computing system 108 over the network 116.

The merchant provider computing system 110 is owned by, associated with, or otherwise operated by a merchant provider institution (e.g., a bank or other financial institution) that maintains one or more accounts held by various customers (e.g., the merchant associated with the merchant computing system 104), such as demand deposit accounts, credit card accounts, receivables accounts, and so on.

In some instances, the merchant provider computing system 110 may, for example, comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the merchant provider computing system 110 may comprise and/or have various other devices communicably coupled thereto, such as, for example, desktop or laptop computers (e.g., tablet computers), smartphones, wearable devices (e.g., smartwatches), and/or other suitable devices.

The merchant provider computing system 110 includes a merchant provider account database 126 that is structured or configured to retrievably store customer account information associated with various customer accounts (e.g., an account of the merchant) held or otherwise maintained by the merchant provider institution on behalf of its customers. In some instances, the customer account information includes both customer information and account information pertaining to a given customer account. For example, in some instances, the customer information may include a name, a phone number, an e-mail address, a physical address, a username, etc. of the customer associated with the customer account. In some instances, the account information may include a listing of payment accounts associated with each customer account, information pertaining to the type and corresponding capabilities of each payment account, interest rates associated with each payment account, rewards rates associated with each payment account, etc.

In some instances, the merchant provider account database 126 may further retrievably store various payment method incentive program account data associated with various registered entities (e.g., merchants, payment card networks, transaction processing entities, other financial institutions). For example, as will be discussed in detail below, in some instances, the merchant provider computing system 110 may offer a payment method incentive program for which various entities may register to have various offers presented to customers during transactions to incentivize those customers to use specific payment methods. Accordingly, in some instances, the merchant provider account database 126 may retrievably store payment method incentive program account data, such as, for example, various offers corresponding to specific payment methods offered by the various registered entities.

The merchant provider computing system 110 further includes an account processing circuit 128 that is structured or configured to perform a variety of functionalities or operations to enable various customer activities in connection with customer account information stored within the merchant provider account database 126. For example, in some instances, the account processing circuit 128 performs various functionalities to enable account opening and/or closing actions, various account transactions (e.g., debit transactions, credit transactions), and/or a variety of other services associated with and/or provided by the provider.

In some instances, the account processing circuit 128 is further structured or configured to enable various entities (e.g., merchants, payment card networks, transaction processing entities) to register for the payment method incentive program. For example, in some instances, the account processing circuit 128 is configured to receive various registration information from registering entities (e.g., from the merchant computing system 104, the transaction processing computing system 108, the payment network provider computing system 112, the customer provider computing system 114) via the network 116. Upon receiving the various registration information, the account processing circuit 128 is configured to create a new payment method incentive program account associated with the registering entity within the merchant provider account database 126 and to store the corresponding registration information within the registering entity's new account. Additionally, the account processing circuit 128 may be structured to or otherwise configured to allow for entities having registered accounts held by the merchant provider institution to periodically update the various registration information stored within the registered account.

In some instances, the registration information may include, for example, various transaction rates (e.g., interchange rates, interest rates, rewards rates) corresponding to various payment methods associated with the registering entity. The registration information may further include one or more offers corresponding to one or more preferred payment methods that the registering entity wishes to offer to customers during various customer transactions. In some instances, the registration information may further include one or more corresponding rules associated with each offer. For example, the rules associated with each offer may include a time period during which the offer is valid, one or more price-based offer modifications associated with the offer (e.g., a discount percentage of 2% is offered for purchases below $100, a discount percentage of 3% is offered for purchases above $100), or any other desired rules that may affect an offer indicated by the registering entity.

The merchant provider computing system 110 further includes a transaction rate transparency circuit 130 that is structured or configured to perform a variety of functionalities or operations to enable the various transaction rate transparency functionalities described herein. For example, in some instances, the transaction rate transparency circuit 130 is configured to receive an indication of a customer transaction and one or more potential payment methods associated with the customer transaction. In response, the transaction rate transparency circuit 130 may retrieve various transaction rate and offer information associated with the various potential payment methods from one or more of the merchant computing system 104, the transaction processing computing system 108, the payment network provider computing system 112, and/or the customer provider computing system 114. In some instances, the transaction rate transparency circuit 130 may further retrieve various stored information pertaining to the potential payment methods that is stored within the merchant provider account database 126 (e.g., from an account registered for the payment method incentive program). The transaction rate transparency circuit 130 is then configured to provide the various transaction rate and offer information and/or a plurality of potential transaction amounts corresponding to the various potential payment methods.

In some instances, the transaction rate transparency circuit 130 is further configured to generate, maintain, and/or otherwise provide transaction rate transparency applications or application programming interfaces (APIs) and/or payment method incentive applications or APIs to the customer device 102, the transaction processing device 106, the transaction processing computing system 108, the payment network provider computing system 112, and/or the customer provider computing system 114 to enable various display, information input, and payment selection processes, as will be described in detail below.

Although not specifically shown, it will be appreciated that the merchant provider computing system 110 may similarly include various I/O devices (e.g., similar to I/O device(s) 118), a network interface circuit (e.g., similar to the network interface circuit 120), client applications (e.g., similar to client applications 122), and other circuits in the same or similar manner to the other components of computing environment 100. For example, in some instances, the merchant provider computing system 110 may include a network interface circuit having user interface program logic configured to generate and present application pages, web pages, and/or various other data to users accessing the merchant provider computing system 110 over the network 116.

The payment network provider computing system 112 is controlled by, managed by, owned by, and/or otherwise associated with a payment network provider (e.g., Visa®, Mastercard®, American Express®) that provides, maintains, or otherwise supports an existing payment network (e.g., a payment card network). In some embodiments, the payment network provider computing system 112 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures. In some instances, the payment network provider computing system 112 may comprise and/or have various other devices communicably coupled thereto, such as, for example, desktop or laptop computers (e.g., tablet computers), smartphones, wearable devices (e.g., smartwatches), and/or other suitable devices.

Although not specifically shown, it will be appreciated that the payment network provider computing system 112 may similarly include various I/O devices (e.g., similar to I/O device(s) 118), a network interface circuit (e.g., similar to the network interface circuit 120), client applications (e.g., similar to client applications 122), additional databases, and other circuits in the same or similar manner to the other components of computing environment 100. For example, in some instances, the payment network provider computing system 112 may include a network interface circuit having user interface program logic configured to generate and present application pages, web pages, and/or various other data to users accessing the payment network provider computing system 112 over the network 116.

The customer provider computing system 114 is owned by, associated with, or otherwise operated by a customer provider institution (e.g., a bank or other financial institution) that maintains one or more accounts held by various customers (e.g., the customer associated with the customer device 102), such as demand deposit accounts, credit card accounts, receivables accounts, and so on. While the customer provider computing system 114 is shown as being separate and distinct from the merchant provider computing system 110, it will be appreciated that, in some instances, the same provider institution may service both the merchant and the customer, such that the merchant provider computing system 110 and the customer provider computing system 114 may comprise a single provider computing system. Alternatively, in the instances that the customer provider computing system 114 is separate and distinct from the merchant provider computing system 110 (as shown in FIG. 1), the customer provider computing system 114 may include similar components to the merchant provider computing system 110 described above.

For example, in some instances, the customer provider computing system 114 may similarly comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the customer provider computing system 114 may further similarly comprise and/or have various other devices communicably coupled thereto, such as, for example, desktop or laptop computers (e.g., tablet computers), smartphones, wearable devices (e.g., smartwatches), and/or other suitable devices.

The customer provider computing system 114 includes a customer provider account database 132 that is similar to the merchant provider account database 126 described above. For example, the customer provider account database 132 is similarly structured or configured to retrievably store customer account information associated with various customer accounts (e.g., an account of the merchant) held or otherwise maintained by the customer provider institution on behalf of its customers. In some instances, the customer account information includes similar customer information and account information pertaining to customer accounts as described above, with reference to the merchant provider account database 126.

Although not specifically shown, in some instances, the customer provider computing system 114 may include an account processing circuit (e.g., similar to the account processing circuit 128) and a transaction rate transparency circuit (e.g., similar to the transaction rate transparency circuit 130) to allow for the customer provider computing system 114 to perform the various functions described herein, with respect to the merchant provider computing system 110. Accordingly, in these instances, the customer provider account database 132 may similarly retrievably store various payment method incentive program account data associated with various registered entities (e.g., merchants, payment card networks, transaction processing entities, other financial institutions), such as, for example, various offers corresponding to specific payment methods offered by the various registered entities.

Further, although also not specifically shown, it will be appreciated that the customer provider computing system 114 may similarly include various I/O devices (e.g., similar to I/O device(s) 118), a network interface circuit (e.g., similar to the network interface circuit 120), client applications (e.g., similar to client applications 122), and various other circuits in the same or similar manner to the other components of computing environment 100. For example, in some instances, the customer provider computing system 114 may include a network interface circuit having user interface program logic configured to generate and present application pages, web pages, and/or various other data to users accessing the customer provider computing system 114 over the network 116.

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Referring now to FIG. 2, a flow diagram of a method 200 for registering for a payment method incentive program is shown, according to an example embodiment. In some instances, the method 200 may be performed or otherwise executed using various components of the computing environment 100.

As shown, the method 200 begins with a registration request being received, at step 202. For example, in some instances, the registration request may be received by the merchant provider computing system 110 from any of the customer (e.g., via the customer device 102), the transaction processing entity (e.g., via the transaction processing computing system 108), the payment network provider (e.g., via the payment network provider computing system 112), or the customer provider institution (e.g., via the customer provider computing system 114) over the network 116. In some instances, the registration request may specify the entity requesting registration for the payment method incentive program.

Upon receiving the registration request, at step 202, a registered account associated with the registering entity is created and stored, at step 204. For example, in some instances, the account processing circuit 128 may be configured to receive the registration request and create and store a new registered account based on the type of entity requesting registration and various additional information. For example, in some instances, the registration request may include an indication of one or more payment methods associated with the registering entity (e.g., payment cards utilized by the customer and/or supported by the merchant, the transaction processing entity, the payment card network, and/or the customer provider institution). Accordingly, the account processing circuit 128 may create and store a new registered account for the payment method incentive program, which may include an indication of the entity associated with the new registered account, as well as the one or more payment methods associated with the registered entity.

In some instances, upon creating a new registered account associated with a new registered entity, the merchant provider computing system 110 may automatically provide a payment method incentive program application associated with the payment method incentive program to the registering entity. For example, in some instances, the merchant provider computing system 110 may provide the payment method incentive program application to any of the customer device 102, the merchant computing system 104, the transaction processing device 106, the transaction processing computing system 108, the payment network provider computing system 112, and/or the customer provider computing system 114. In some instances, the payment method incentive program application may allow the registering entity to view various transaction rates (e.g., interchange rates, interest rates, rewards rates, effective rates) associated with various payment methods and/or provide various offers to be presented to customers for using specific payment methods.

Upon creating and storing the registered account, at step 204, various transaction rates may be provided to the registered entity, at step 206. For example, in some instances, the transaction rates may be periodically pushed from the merchant provider computing system 110 to the appropriate registered entity via the payment method incentive program application.

In some instances, an offer is received from the registered entity, at step 208. For example, one or more of the various registered entities may then provide offers pertaining to one or more of the payment methods to be provided to customers. In some instances, the offers may comprise a discount percentage that will be applied to the customer's purchase if the customer uses a given payment method. For example, if the registered entity is a merchant that provides its own merchant-based payment card, the offer may be a discount percentage (above and beyond a standard discount percentage) for using the merchant-based payment card. In other instances, the offer could be an introductory discount percentage for opening a new merchant-based payment card to pay for a given purchase. In yet some other instances, the offer may be a financing option (e.g., a new line of credit/a merchant-based credit card) provided by the registered entity with which the customer may pay for the purchase.

In some instances, an offer provided by the registered entity may be a tiered offer. For example, in some instances, a transaction offer for a given payment method may be a tiered discount percentage offer based on a purchase amount associated with a given transaction. That is, the tiered discount percentage offer may indicate that a first discount percentage (e.g., 1%) will be applied to purchase amounts under a first price threshold (e.g., $100), a second discount percentage (e.g., 2%) will be applied to purchase amounts equal to or above the first price threshold and below a second price threshold (e.g., $1,000), and a third discount percentage (e.g., 3%) will be applied to purchase amounts equal to or above the second price threshold.

In some instances, a transaction offer may be a tiered financing/new line of credit option. For example, similar to the tiered discount percentage, the tiered financing/new line of credit option offer may indicate that financing or a new line of credit (e.g., a new merchant-based credit card) for a given transaction may be obtained at a first interest rate (e.g., 8%) for purchase amounts under a first price threshold (e.g., $100), at a second interest rate (e.g., 6%) for purchase amounts equal to or above the first price threshold and below a second price threshold (e.g., $1,000), and at a third interest rate (e.g., 4%) for purchase amounts equal to or above the second price threshold.

In some instances, registered entities may provide transaction offers on an ongoing basis via the payment method incentive program application. For example, in some instances, upon a customer initiating a transaction, the merchant may receive an indication of various transaction rates associated with a variety of potential payment methods the customer may use to complete the transaction. In these instances, the merchant may elect to provide a discount percentage rate for certain payment methods (e.g., cash or debit) in real-time or near real-time via the payment method incentive application. For example, if a potential payment method is a credit card having an interchange rate of 3%, the merchant may provide an offer in the form of a discount percentage rate of 1% if the customer uses cash or debit to complete the transaction. Accordingly, if the customer uses cash instead of the credit card, the customer benefits from the 1% discount percentage and the merchant benefits by receiving 99% of the total purchase price instead of 97% of the total purchase price they would have received had the customer used the credit card.

Additionally, in some instances, offers may be provided by registering entities with corresponding indication of valid time periods associated with the offers. That is, the valid time periods may be predetermined time periods during which each given offer is valid. For example, in some instances, a registered entity may only wish to allow for a given offer to be utilized for a predetermined amount of time (e.g., a day, a week, a month). Accordingly, after the time period has ended, the merchant provider computing system 110 will no longer apply the offer.

Upon receiving the offer from the registered entity, at step 208, the offer may then be stored by the merchant provider computing system 110. For example, in some instances, the merchant provider computing system 110 (e.g., the account processing circuit 128) is configured to store the new registered account in the merchant provider account database 126.

Figure 3:
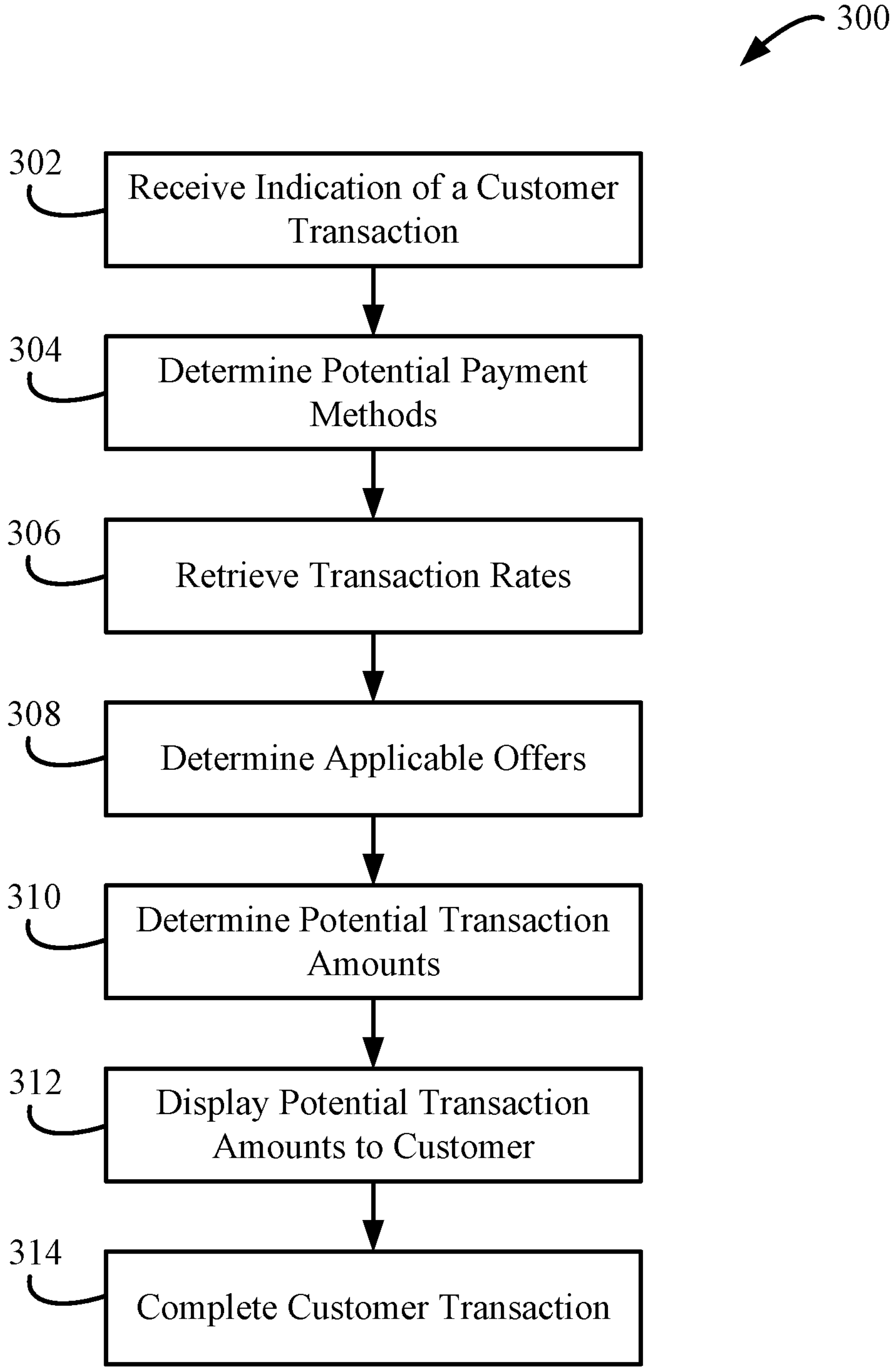
FIG. 3 is a flow diagram of a method for providing transaction rate transparency during a customer transaction, according to an example embodiment.

Referring now to FIG. 3, a flow diagram of a method 300 for providing transaction rate transparency during a customer transaction is shown, according to an example embodiment. In some instances, the method 300 may be performed or otherwise executed using various components of the computing environment 100.

As shown, the method 300 begins with an indication of a customer transaction being received, at step 302. For example, the indication of the customer transaction and associated transaction information may be received prior to the customer providing any payment method for completing the transaction based on the merchant and/or the transaction processing entity being registered with the merchant provider institution, as discussed above, with respect to FIG. 2.

In some instances, the indication of the customer transaction may be received at a point-of-sale location associated with the merchant (e.g., via the merchant computing system 104 and/or the transaction processing device 106). The indication of the customer transaction may be automatically generated based on one or more items being scanned or otherwise entered for purchase at the point-of-sale location associated with a merchant that is registered for the payment method incentive program.

In some other instances, the indication of the customer transaction may be received through an online shopping website associated with the merchant (e.g., a retail website hosted by or otherwise affiliated with the merchant computing system 104). Accordingly, in these instances, the indication of the customer transaction may be automatically generated at a predetermined step within an online shopping experience of a merchant that is registered for the payment method incentive program. For example, when a customer makes an online purchase from the merchant, the indication of the customer transaction may be automatically generated upon the customer proceeding to checkout or otherwise initiating the online purchase.

In either of the aforementioned cases, the indication of the customer transaction and the associated transaction information may be automatically transmitted to the transaction rate transparency circuit 130 of the merchant provider computing system 110 by the merchant computing system 104 or the transaction processing device 106.

In some other instances, the indication of the customer transaction and associated transaction information is received after the customer has provided a potential payment method for completion of the customer transaction. For example, in some instances, the customer provider institution of the customer may be registered for the payment method incentive program, as discussed above, with respect to FIG. 2. In these instances, when the customer makes a transaction using a payment method (e.g., a debit card, a credit card, a pre-paid card, PayPal, Apple Pay®) associated with the customer provider entity (e.g., associated with a customer account stored within the customer provider account database 132), the customer provider computing system 114 may receive the indication of the customer transaction and associated transaction information via a traditional payment rail (e.g., via a payment network associated with the payment network provide). Upon receiving the indication of the customer transaction and the associated transaction information via the traditional payment rail, the customer provider computing system 114 may automatically place a temporary hold or pause on the transaction (e.g., by temporarily withholding approval of the transaction) until the customer confirms the payment method they wish to use to complete the transaction, as will be described further below.

In any case, in some instances, the indication of the customer transaction and the associated transaction information may include a variety of pertinent information regarding the customer transaction. For example, in some instances, the indication of the customer transaction and the associated transaction information may include an initial transaction amount corresponding to a purchase price associated with the customer transaction, a customer identifier, a customer device identifier, a time of the transaction, a merchant identifier associated with the transaction, one or more merchant device identifiers, a transaction processing entity identifier associated with the transaction, one or more transaction processing device identifiers, a customer provider institution identifier associated with the transaction, payment method information associated with the transaction, and/or any other pertinent information.

As an example, in some instances, the customer may provide a customer identifier, such as a phone number, an e-mail address, a name, an address, and/or a username of the customer, to an input device associated with the merchant computing system 104 and/or the transaction processing device 106 prior to or after a transaction has been initiated. Accordingly, in these instances, the customer identifier may be provided to the merchant provider computing system 110 with the indication of the customer transaction.

In some instances, the merchant computing system 104 may supplement the customer identifier provided by the customer with various additional information. For example, if the customer has an account with the merchant (e.g., stored within the merchant account database 124), the merchant computing system 104 may retrieve additional information associated with the customer from the merchant account database 124 for sending to the merchant provider computing system 110 (e.g., the transaction rate transparency circuit 130). In some instances, the additional information provided by the merchant to the merchant provider computing system 110 may include a list of various payment methods (e.g., debit cards, credit cards) that the customer has used at the merchant in the past. In some instances, the additional information may include a financing option offered by the merchant that may be utilized to pay for the customer transaction (e.g., as another potential payment method).

For example, in some instances, the merchant may store an indication of each payment method utilized by a customer in the customer's account stored within the merchant account database 124. Accordingly, upon receiving a customer identifier associated with the customer, the merchant computing system 104 may identify the various stored payment methods associated with the customer based on the customer's account with the merchant for sending to the merchant provider computing system 110.

Once the indication of the customer transaction is received, at step 302, various potential payment methods for the customer transaction are determined, at step 304. In some instances, the transaction rate transparency circuit 130 may determine various potential payment methods for the customer transaction. For example, the potential payment methods may comprise a set of default payment methods based on commonly utilized payment types (e.g., debit cards, credit cards, pre-paid cards), transaction processing entities, financial institutions, and/or payment network providers.

In some instances, the potential payment methods may be particularly tailored to a given customer transaction based on the transaction information received by the transaction rate transparency circuit 130. For example, in some instances, the transaction rate transparency circuit 130 may determine the potential payment methods based on the list of payment methods provided by the merchant. In some instances, the transaction rate transparency circuit 130 may determine the potential payment methods by identifying one or more payment methods associated with the customer. For example, in some instances, the customer identifier may be utilized to identify one or more payment methods associated with the customer stored within a customer account within the merchant provider account database 126.

In some instances, the transaction rate transparency circuit 130 may be configured to communicate with the customer provider computing system 114 via the network 116 to identify one or more payment methods associated with the customer stored within a customer account within the customer provider account database 132. For example, the transaction rate transparency circuit 130 may transmit the customer identifier to the customer provider computing system 114 with a request for any payment methods associated with customer, and the customer provider computing system 114 may identify the customer account based on the customer identifier and provide the associated payment methods to the merchant provider computing system 110.

Once the various potential payment methods have been determined, at step 304, transaction rates associated with each of the potential payment methods are retrieved, at step 306. For example, in some instances, upon determining the potential payment methods for a given transaction, the transaction rate transparency circuit 130 may retrieve transaction rates from the merchant computing system 104, the transaction processing computing system 108, the payment network provider computing system 112, the customer provider computing system 114, and/or any other relevant third-party computing systems associated with the potential payment methods (e.g., other financial institutions, merchants, transaction processing entities, and/or payment network providers). For example, in some instances, the transaction rates may be retrieved from the appropriate entities based on one or more of the merchant identifier, the transaction processing entity identifier, the customer provider institution identifier, and/or any other pertinent information received with the indication of the customer transaction and the associated transaction information.

In some instances, the transaction rates may include, for example, an interchange rate associated a given payment method, an interest rate associated with a given payment method, and/or a rewards rate (e.g., a cashback percentage, airline miles, rewards points) associated with a given transaction. As used herein, the term "interchange rate" may be used to refer to a percentage-based fee applied to transactions using or otherwise associated with a card-issuing entity (e.g., the merchant, the merchant provider institution, the customer provider institution), a payment network provider, and/or a transaction processing entity.

For example, in some instances, the customer may potentially pay for a customer transaction using a merchant payment card provided by the merchant. In these cases, the merchant computing system 104 may provide the transaction rate transparency circuit 130 with an interchange rate, an interest rate, and/or a rewards rate associated with the merchant payment card. Similarly, in some instances, the transaction processing entity (e.g., via the transaction processing computing system 108) may provide the transaction rate transparency circuit 130 with an interchange rate charged on transactions conducted using the transaction processing device 106. Further, the payment network provider (e.g., via the payment network provider computing system 112) may provide the transaction rate transparency circuit 130 with an indication of an interchange rate charged on transactions conducted using a payment network offered by the payment network provider. Finally, the customer provider computing system 114 may provide an interchange rate charged on transactions using a given payment method associated with the customer provider institution, an interest rate associated with a given payment method, and/or a rewards rate associated with a given payment method.

In some instances, the transaction rate transparency circuit 130 may retrieve the transaction rates from any of the aforementioned entities in real-time. For example, in some instances, the transaction rate transparency circuit 130 may retrieve a real-time interest rate on a payment card offered by, for example, the merchant (e.g., from the merchant computing system 104), the customer provider institution (e.g., from the customer provider computing system 114), or a third-party provider institution (e.g., from another third-party computing system via the network 116).

Similarly, in some instances, the transaction rate transparency circuit 130 may pull or otherwise retrieve a real-time balance of an account associated with a given payment method (e.g., a debit account, a credit account). For example, the transaction rate transparency circuit 130 may pull or otherwise retrieve a real-time balance of a debit or credit account held at the merchant (e.g., within the merchant account database 124), the customer provider institution (e.g., within the customer provider account database 132), or any other third-party provider institution.

Additionally, once the various potential payment methods have been determined, at step 304, applicable offers associated with each of the potential payment methods are determined, at step 308. For example, as discussed above, in some instances, various registered entities may provide various transaction offers to be applied to various payment methods, which may be stored in corresponding registered accounts within the merchant provider account database 126. Accordingly, once the potential payment methods have been determined, the transaction rate transparency circuit 130 may query the merchant provider account database 126 to determine whether any registered entities have provided transaction offers associated with any of the potential payment methods determined for the customer transaction.

Once the potential payment methods, the associated transaction rates, and the applicable offers have been determined, at steps 304-308, various potential transaction amounts corresponding to each of the potential payment methods is determined, at step 310. The various transaction amounts may be calculated by applying the one or more transaction rates and applicable offers corresponding to each potential payment method to the initial transaction amount corresponding to the purchase price associated with the customer transaction.

For example, in some instances, a total interchange rate applied to a given payment method may be an aggregate total of the individual interchange rates applied by each of the multiple parties involved in completing the transactions (e.g., the transaction processing entity, the merchant provider institution, the payment network provider, the customer provider institution). Accordingly, in some instances, the transaction rate transparency circuit 130 may calculate apply the total interchange rate to the initial transaction amount for a given payment method. For example, in some instances, if an aggregate interchange rate for a given payment method is 3% and the initial transaction is $100, the calculated potential transaction amount for using the given payment method would be $103. Similarly, if a transaction offer for a given payment method is for a discount percentage of 3% and the initial transaction is $100, the calculated potential transaction amount for using the given payment method would be $97.

In some instances, the potential transaction amount for using a given payment method may include both an interchange rate and a discount percentage. For example, if an aggregate interchange rate is 1% and a discount rate is 2% for an initial transaction amount of $100, the discount rate may be applied to the transaction amount first, bringing the discounted transaction amount to $98 (e.g., $100 minus 2% of $100), and then the interchange rate may be applied to the discounted transaction amount, bringing the potential transaction amount to $98.98 (e.g., $98 plus 1% of $98).

In some instances, determining the transaction amounts may further include determining an "effective" amount for each potential payment method, accounting for a rewards rate associated with each potential payment method. For example, in some instances, a rewards rate may be a cashback percentage for a given payment method. As such, in some instances, the "effective" transaction rate may be calculated by the transaction rate transparency circuit 130 by combining the total interchange rate applied to a given payment method, any offers applied to the given payment method, and the rewards rate applied to the given payment method. For example, in the example above, where the interchange rate is 1% and the discount rate is 2% for an initial transaction amount of $100, the potential transaction amount that would be initially charged to the customer's payment card would be $98.98. However, if the payment card has a 1% cashback reward on purchases applied to the charged amount, the customer may ultimately receive a reward of approximately $0.99. Accordingly, in this instance, the transaction rate transparency circuit 130 would calculate the "effective" transaction amount as $97.99 (e.g., the initially charged potential transaction amount minus the amount of cashback received in rewards).

Once the various potential transaction amounts have been determined, at step 310, the potential transaction amounts are displayed to the customer, at step 312. For example, in some instances, the transaction rate transparency circuit 130 is configured to generate a graphical user interface (e.g., the graphical user interface 400 shown in FIG. 4, the graphical user interface 500 shown in FIG. 5, the graphical user interface 700 shown in FIG. 7) to be displayed to the customer.

For example, in some instances, the graphical user interface may be displayed to the customer in a variety of ways. For example, in some instances, the graphical user interface may be displayed to the customer on, for example, a point-of-sale device (e.g., a self-checkout device) associated with or otherwise in communication with the merchant computing system 104 or the transaction processing device 106 at a point of sale associated with the merchant. In some instances, the graphical user interface 400 may be displayed to the customer on the customer device 102 (e.g., a tablet, a laptop computer, another personal computing device) during an online shopping experience on a website supported or maintained by the merchant computing system 104.

For example, in some instances, the graphical user interface may be transmitted to the customer device 102, the merchant computing system 104, and/or the transaction processing device 106 via a payment incentive program application downloaded and stored on the customer device 102, the merchant computing system 104, and/or the transaction processing device 106 during registration for the payment method incentive program, as discussed above. For example, in some instances, the transaction rate transparency circuit 130 may communicate with the customer device 102, the merchant computing system 104, and/or the transaction processing device 106 via an application programming interface (API) interaction associated with the payment method incentive program application.

In some instances, the graphical user interface may be transmitted to the customer device 102 via a financial institution application associated with the customer provider institution and/or the merchant provider institution. For example, in some instances, the customer may have an account with the merchant provider computing system 110 or the customer provider computing system 114 may be registered for the payment method incentive program. In either case, the customer may have an associated financial institution application from either of the merchant provider computing system 110 or the customer provider computing system 114 that includes various functionality of the payment method incentive program application described herein.

Figure 4:
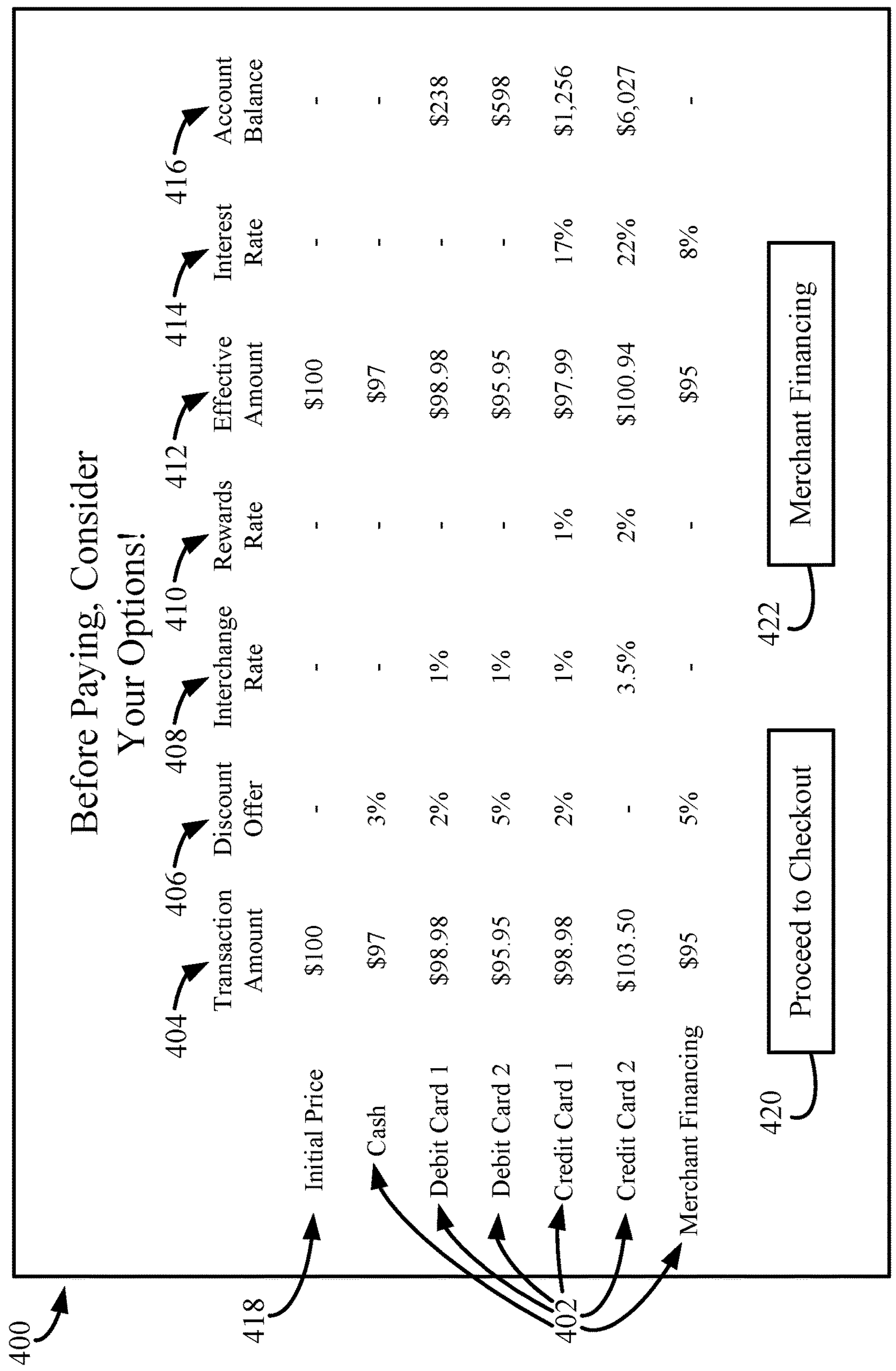
FIG. 4 is a graphical user interface providing various payment method option information, according to an example embodiment.

Referring to FIG. 4, a graphical user interface 400 is shown, according to an example embodiment. In some instances, the graphical user interface 400 may be displayed to the customer prior to the customer providing a payment method (e.g., cash, a debit card, a credit card) for completing the customer transaction via any of the customer device 102, the merchant computing system 104, and/or the transaction processing device 106. It should be appreciated that the graphical user interface 400 may be provided during a point-of-sale transaction at a merchant location (e.g., via a point-of-sale device associated with the merchant computing system 104 or the transaction processing device 106) or during an online transaction with an online merchant (e.g., via the customer device 102).

As illustrated, the graphical user interface 400 includes a variety of information pertaining to different potential payment methods 402 that the customer may utilize to complete the customer transaction. For example, in some instances, each potential payment method 402 may include a transaction amount 404, a discount offer 406, an interchange rate 408, a rewards rate 410, an effective transaction amount 412, an interest rate 414, and/or an account balance 416.

As described herein, the transaction amount 404 for each payment option may be the amount that the customer would initially pay for the customer transaction if they utilized that corresponding payment method 402. As shown, in some instances, the discount offer 406 may be a percentage-based discount offered by one or more registered entities (e.g., the merchant, the transaction processing entity, the merchant provider institution, the payment network provider, the customer provider institution). In some instances, the percentage-based discount displayed to the customer may be an aggregate discount based on multiple discount offers provided by multiple registered entities. Further, as also described herein, the interchange rate 408 may be a percentage-based fee applied to transactions using the associated payment method 402 by one or more entities involved in processing transactions using the associated payment method 402. Similarly, the percentage-based fee may be an aggregate total including fees charged by multiple entities.

As depicted in FIG. 4 and described herein, in some instances, the transaction amount 404 for each payment method may be calculated by the transaction rate transparency circuit 130 by taking an initial price 418 of the customer transaction, subtracting the discount percentage (e.g., the discount offer 406), and then adding the appropriate interchange fees (e.g., the interchange rate 408). In some other instances, the merchant may not pass any of the interchange fee on to the customer. Accordingly, in these instances, the graphical user interface 400 may omit the interchange rate information, and the transaction amount 404 for each payment method may alternatively be calculated by the transaction rate transparency circuit 130 by simply taking the initial price 418 of the customer transaction and subtracting the discount percentage (e.g., the discount offer 406). In some instances, the merchant may indicate whether they wish to pass the interchange rate on to customers while registering for the payment method incentive program or via the payment method incentive program application.

The rewards rate 410 may additionally be displayed for each appropriate payment method 402. As described herein the rewards rate 410 may be a percentage-based cashback reward associated with a given payment method. The rewards rate 410 may be utilized to further calculate the effective transaction amount 412. For example, the transaction rate transparency circuit 130 may calculate the effective transaction amount 412 by subtracting the cashback percentage (e.g., the rewards rate 410) from the transaction amount 404.

The effective transaction amount 412 is the transaction amount that the customer ultimately "effectively" pays for the transaction if the customer uses a given payment method 402. That is, if the customer is initially charged the transaction amount (e.g., $103.50) for using a given credit card (e.g., "Credit Card 2" in FIG. 4) after applying the appropriate discount offer 406 (e.g., there is no discount applied to "Credit Card 2") and interchange rate 408 (e.g., 3.5%) to the initial price 418 (e.g., $100) associated with the customer transaction, but then receives rewards corresponding to the rewards rate 410 (e.g., 2%), the customer ultimately pays an effective transaction amount (e.g., $100.94) that is less than the initially charged transaction amount 404 ($103.50).

In some instances, the graphical user interface 400 further includes the interest rate 414 and the account balance 416 associated with each appropriate payment method 402. For example, in some instances, as described herein, the transaction rate transparency circuit 130 may pull real-time account information associated with various payment methods from the customer provider computing system 114 and/or one or more third-party computing system associated with each appropriate payment method 402 (e.g., via one or more APIs) to identify the interest rate 414 (e.g., a real-time variable interest rate) and/or the account balance 416 (e.g., a real-time account balance) associated with each appropriate payment method 402.

As discussed above, in some instances, the graphical user interface 400 may be presented to the customer prior to the customer presenting a payment method for completing the customer transaction. Accordingly, in some instances, the graphical user interface 400 may include a selectable button 420 configured to allow the customer to advance to a final payment screen for completing the customer transaction.

Additionally, in some instances, as shown in FIG. 4, the potential payment methods 402 may include a merchant financing option. The merchant financing option may be a new line of credit (e.g., a new merchant-based credit card) offered by the merchant to complete the customer transaction. Accordingly, in some instances, the graphical user interface 400 includes a second selectable button 422 that is selectable by the customer to navigate toward a merchant financing sign-up page associated with the merchant financing option. As such, the customer is given the option of actively signing up for a new merchant financing option (e.g., a new merchant-based credit card) while conducting the customer transaction for use in completing the customer transaction.

It will be appreciated that, in some instances, not all of the information displayed on the graphical user interface 400 may be desired in some scenarios. Further, in some instances, depending on the device on which the payment option is to be displayed, not all of the information displayed on the graphical user interface 400 may fit on a given screen (e.g., in the context of a small card terminal device). Accordingly, in some instances, the amount of payment option information displayed to the customer may vary based on the device used to display the payment option information to the customer.

Figure 5:
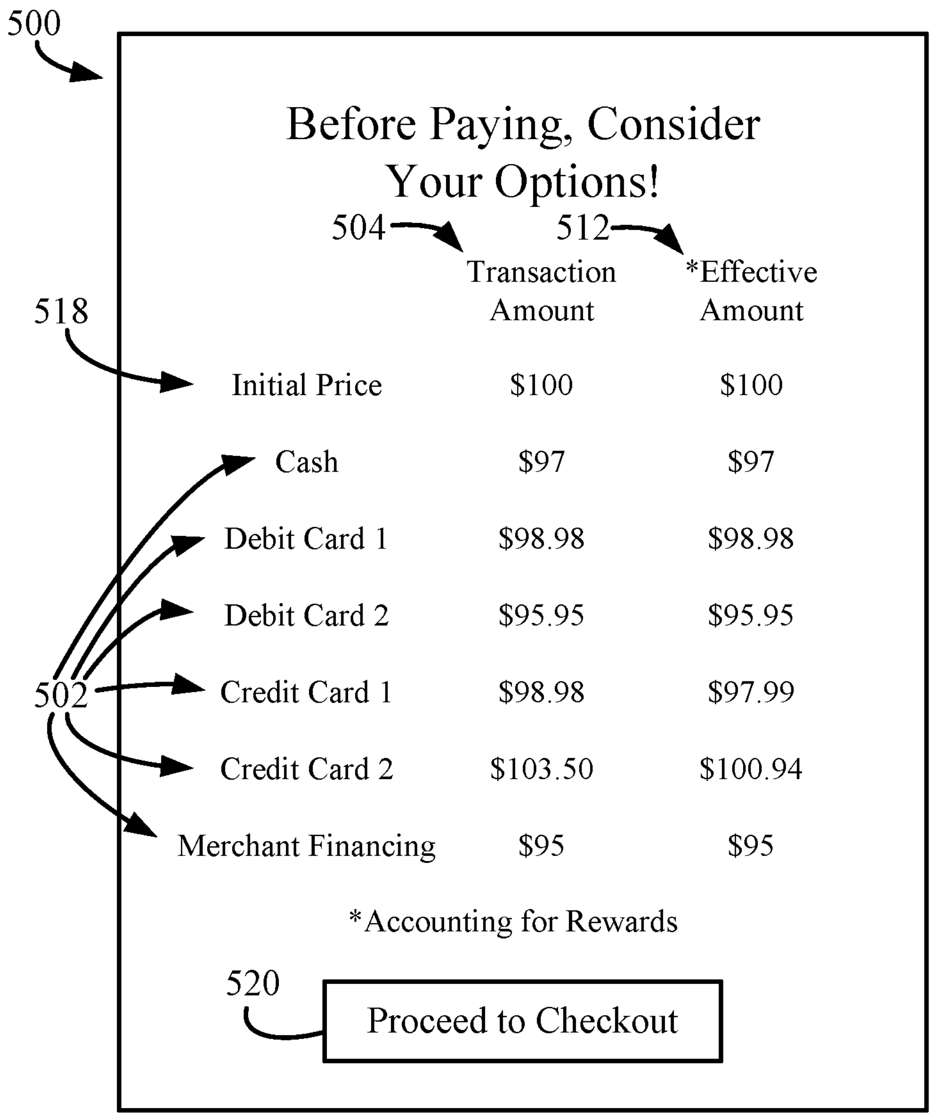
FIG. 5 is a graphical user interface providing various payment method option information, according to an example embodiment.

For example, referring to FIG. 5, another graphical user interface 500 is shown, according to an example embodiment. As illustrated, the graphical user interface 500 includes similar payment option information as compared to the graphical user interface 400 shown in FIG. 4. For example, the graphical user interface 500 similarly includes a transaction amount 504 and an effective transaction amount 512 for a plurality of potential payment methods 502 that are each based on an initial price 518 of the customer transaction, as well as a selectable button 520 configured to allow the customer to advance to a final payment screen (e.g., similar to the payment methods 402, the transaction amount 404, the effective transaction amount 412, the initial price 418, and the selectable button 420 of the graphical user interface 400). However, the graphical user interface 500 does not include any of the various rate information or account balance information provided in graphical user interface 400. Accordingly, the graphical user interface 500 may be more appropriate for a smaller device, such as a small card terminal device.

In some instances, the transaction rate transparency circuit 130 is configured to determine a type of device that will be displaying the payment option information based on various device identifiers received with the indication of the customer transaction. For example, in some instances, the transaction rate transparency circuit 130 may receive one or more of a customer device identifier associated with the customer device 102, a merchant device identifier associated with a point-of-sale device of the merchant, or a transaction processing device identifier associated with the transaction processing device 106. Accordingly, based on the received device identifier(s), the transaction rate transparency circuit 130 may determine one or more display size characteristics (e.g., dimensions of a display of the corresponding device). The transaction rate transparency circuit 130 may then tailor the generated graphical user interface (e.g., include more or less payment option information) according to the determined dimensions of the display of the corresponding device that will ultimately display the graphical user interface to the customer.

In some instances, a graphical user interface including various payment option information may be generated and displayed to a customer after the customer has provided a payment method for completing the customer transaction. For example, as described herein, in some instances, the customer may attempt to pay using a payment method (e.g., a payment card) associated with a payment account held by the merchant provider institution (e.g., stored within the merchant provider account database 126). In some other instances, the customer provider computing system 114 may be registered for the payment method incentive program and the customer may attempt to pay using a payment method (e.g., a payment card) associated with a payment account held by the customer provider institution (e.g., stored within the customer provider account database 132).

In either case, upon the customer attempting the use the payment method associated with the merchant provider institution or the customer provider institution (e.g., upon the customer dipping, tapping, swiping, or otherwise providing a corresponding payment card to a point-of-sale device associated with the merchant computing system 104 or the transaction processing device 106), the corresponding provider institution may receive a request for approval of the customer transaction via a traditional payment rail. Upon receiving the request for approval, the corresponding provider institution may automatically delay the approval and/or place a temporary hold or pause on the customer transaction until the customer confirms that which payment method they wish to use to complete the transaction.

Figure 6:
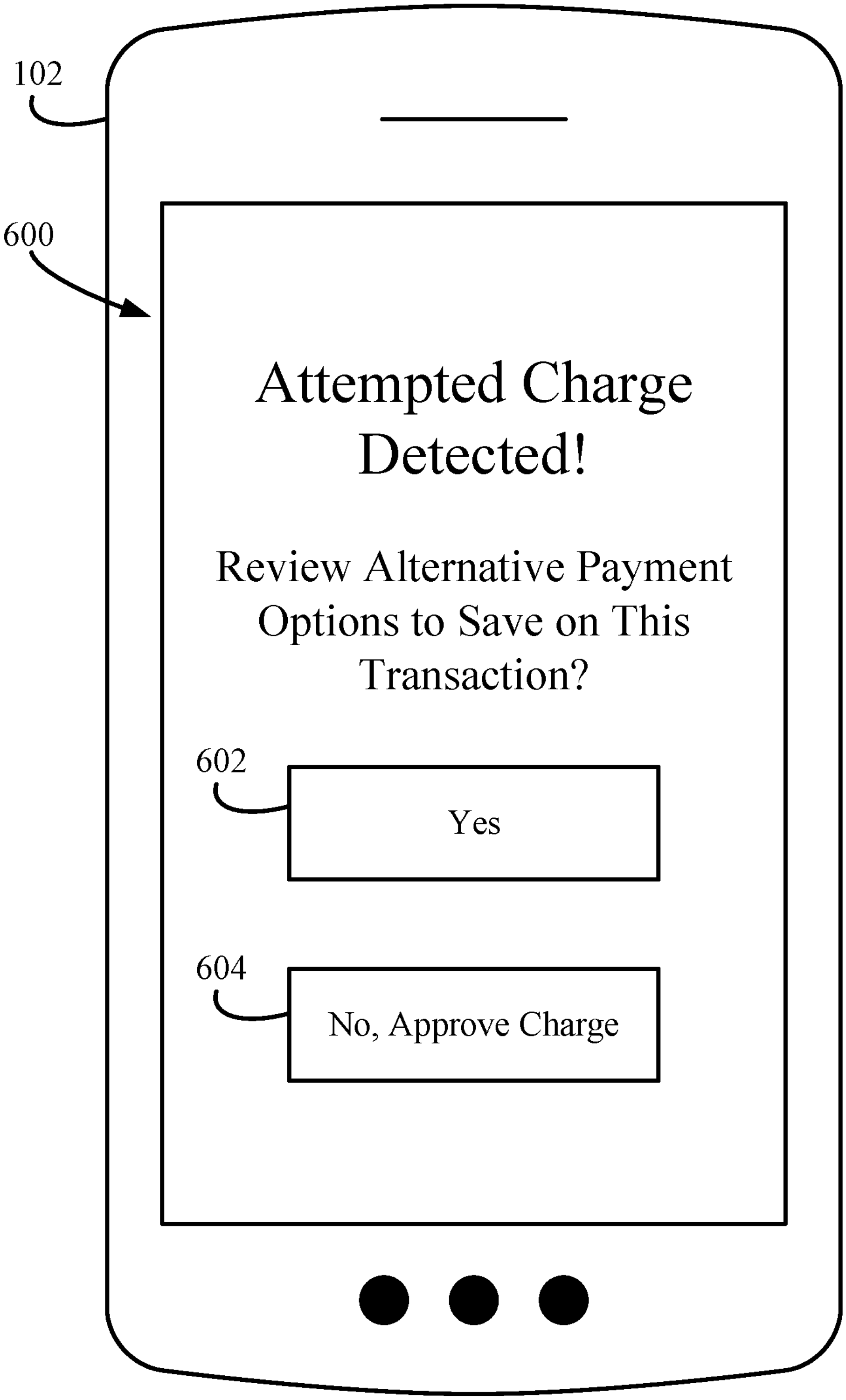
FIG. 6 is a graphical user interface displayed on a customer device prompting the customer to review payment option information, according to an example embodiment.

For example, referring to FIG. 6, an example graphical user interface 600 provided on the customer device 102 is shown, according to an example embodiment. As shown, the graphical user interface 600 includes an indication that an attempted charge as been attempted and a prompt asking the customer whether they would like to review alternative payment options to save on the customer transaction. The graphical user interface 600 further includes a first selectable button 602 and a second selectable button 604. The first selectable button 602 is selectable on the graphical user interface 600 to navigate the user to a payment method information graphical user interface (e.g., graphical user interface 700 shown in FIG. 7). The second selectable button 604 is selectable on the graphical user interface 600 to allow the customer to quickly confirm that they wish for the provider institution to approve the charge and proceed with their initial payment method.

It will be appreciated that, although FIG. 6 shows the graphical user interface 600 being utilized to present the customer with the option to review alternative payment options or confirm that they wish to proceed with their initial payment method, this may be achieved in a number of ways. For example, in some other embodiments, the corresponding provider institution computing system (e.g., the merchant provider computing system 110 or the customer provider computing system 114) may alternatively send the customer device 102 this option via a text message, an e-mail, a push notification, or any other suitable communication method.

For example, in the context of push notification pushed to the customer device, the push notification could include similar selectable buttons allowing for the customer to navigate to a payment method information graphical user interface (e.g., the graphical user interface 700) or to confirm their initial payment method. Similarly, in the context of a text message sent to the customer device 102, the text message could include two separate links, one link similarly allowing for the customer to navigate to a payment method information graphical user interface and a separate link similarly allowing the customer to confirm their initial payment method.

Figure 7:
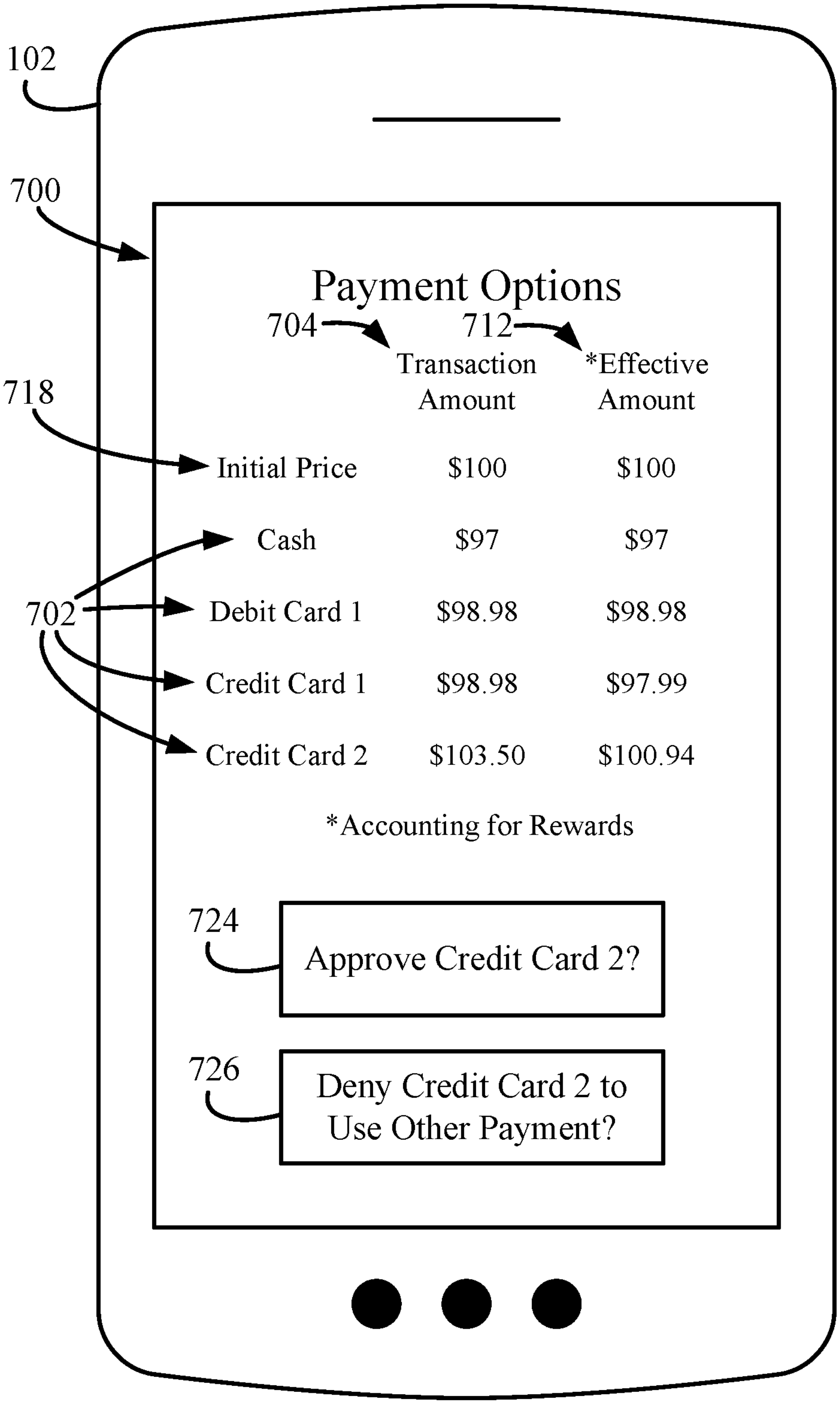
FIG. 7 is a graphical user interface displayed on a customer device displaying various payment option information, according to an example embodiment.

Referring now to FIG. 7, a graphical user interface 700 provided on the customer device 102 is shown, according to an example embodiment. In some instances, the graphical user interface 700 may be transmitted by the transaction rate transparency circuit 130 to the customer device 102 and displayed to the customer upon the customer selecting the first selectable button 602 on the graphical user interface 600 or otherwise indicating that they would like to review the alternative payment options.

As illustrated, the graphical user interface 700 includes similar payment option information as compared to the graphical user interface 500 shown in FIG. 5. For example, the graphical user interface 700 similarly includes a transaction amount 704 and an effective transaction amount 712 for a plurality of potential payment methods 702 that are each based on an initial price 718 of the customer transaction (e.g., similar to the payment methods 502, the transaction amount 504, the effective transaction amount 512, and the initial price 518 of the graphical user interface 500).

However, instead of a selectable button configured to allow the customer to advance to a final payment screen for completing the customer transaction, the graphical user interface 700 includes a first selectable button 724 and a second selectable button 726. The first selectable button 724 is selectable on the graphical user interface 700 to allow the customer to confirm that they wish to proceed with their initially attempted payment method. In some instances, the first selectable button 724 may include an indication of the payment method that the customer initially presented to the merchant (e.g., "Credit Card 2" in the example shown in FIG. 7). It will be appreciated that, in some instances, the graphical user interface 700 may include another type of indication of which payment method the customer attempted to use to complete the customer transaction, such as, for example, underlining, highlighting, circling, or otherwise marking the payment method that the customer presented to the merchant.

The second selectable button 726 is selectable on the graphical user interface 700 to allow the customer to have the customer transaction denied by the corresponding provider institution. For example, upon selecting the second selectable button 726, the corresponding provider institution may get a notification that the customer wishes to have the pending customer transaction with the initially presented payment method denied in favor of a new customer transaction in which the customer will present a different payment method. Accordingly, the corresponding provider institution (e.g., the merchant provider institution or the customer provider institution) may deny the customer transaction, thereby allowing for the customer to initiate a new transaction with the payment method of their choice.

It should be appreciated that the graphical user interfaces shown in FIGS. 4-7 and discussed above are provided as examples and are in no way meant to be limiting. In some instances, the various graphical user interfaces may include additional information, interactive features, and/or other elements generally, in the same or different arrangements, without departing from the scope of the present disclosure.

With reference again to FIG. 3, once the various potential transaction amounts and other payment method information has been displayed to the customer, at step 312, the customer transaction is completed, at step 314. For example, if the payment method information is presented to the customer prior to the customer providing a payment method for completing the customer transaction, the customer may simply advance to a final payment screen (e.g., via interaction with the selectable button 420 on the graphical user interface 400 or the selectable button 520 on the graphical user interface 500) and present whichever payment method they wish to use to complete the customer transaction.

Alternatively, if the payment method information is presented to the customer in response to the customer attempting to use a payment method (e.g., as discussed above, with reference to FIGS. 6 and 7), the customer transaction may either be approved by the corresponding provider institution, in which case the customer transaction will be completed using the payment method initially presented by the customer, or denied by the corresponding provider institution, in which case the customer may initiate a new customer transaction using a different payment method.

Now that the systems and methods have been described above, a number of example scenarios will be described below. It should be appreciated that the following examples are intended to be illustrative and are in no way meant to be limiting.

In some instances, upon initiating a customer transaction, a customer may scan one or more items at a merchant point-of-sale device associated with the merchant computing system 104 (e.g., a merchant that has registered for the payment method incentive program). Prior to the customer providing a payment method for the customer transaction, the point-of-sale device may ask the customer whether they want an e-receipt for the transaction. The customer may then provide an e-mail address to which the e-receipt may be sent by the point-of-sale device.

Upon receiving the e-mail address from the customer, the merchant computing system 104 may automatically query the merchant account database 124 for the e-mail address to identify a customer account associated with the customer. Upon identifying the customer account, the merchant computing system 104 may determine that the customer account is associated with four previously utilized payment methods (e.g., a first debit card from a first provider institution, a second debit card from a second provider institution, a first credit card from a third provider institution, and a second credit card from a fourth provider institution).

Accordingly, the merchant computing system 104 may then transmit an indication of the customer transaction including information regarding the four previously utilized payment methods to the merchant provider computing system 110, and the transaction rate transparency circuit 130 may send back a variety of payment method option information regarding the four previously utilized payment methods to the merchant computing system 104 to be displayed to the customer, as described herein. Accordingly, the customer may be presented with various potential transaction amounts, discount offers, interchange rates, rewards rates, effective transaction amounts, interest rates, and/or account balances pertaining to various payment methods that the customer has used with the merchant in the past, and therefore could likely choose to use to complete the present customer transaction.

In some instances, the merchant computing system 104 is configured to detect customer devices (e.g., the customer device 102) within a given point-of-sale location. For example, in some instances, the merchant computing system 104 may detect customer devices within the point-of-sale location using Wi-Fi connectivity detection, a Bluetooth signal, and/or any other suitable short-range communication signal. For example, in some instances, the merchant computing system 104 may be configured to identify a customer device identifier of each detected customer device within the point-of-sale location.

Accordingly, in some instances, the merchant computing system 104 may identify a customer account associated with the customer device 102 based on the customer identifier by querying the merchant account database 124. In these instances, when the customer goes to check out or otherwise make a purchase at a point-of-sale device, the merchant computing system 104 may be configured to push a notification to the customer asking whether they wish to receive payment method information via the customer device 102. If the customer confirms, the merchant computing system 104 may transmit or otherwise push a graphical user interface similar to those shown in FIGS. 4, 5, and 7 to the customer device 102 for viewing by the customer.

Similarly, in some instances, the merchant may provide a temporary in-store offer to be pushed to detected customer devices within or near a point-of-sale location. For example, in some instances, the merchant computing system 104 may be registered for the payment method incentive program and may be allowed to provide detection-based push-notification discount offers for certain payment methods. For example, in some instances, the merchant may be low on liquid funds (e.g., cash). In these instances, the merchant may wish to temporarily offer a large discount (e.g., 5% off) on purchases made by customers using cash or debits cards. Accordingly, upon detecting customer devices (e.g., the customer device 102) within or near the point-of-sale location, the merchant computing system 104 (e.g., via the payment method incentive program application) may automatically push a notification to the detected customer devices to alert the customers within or near the point-of-sale location about the discount for cash or debit card purchases.

In some instances, the payment method incentive program application is configured to allow registered provider institutions (e.g., the customer provider institution) to offer merchants various intermediate offers to encourage the use of one or more payment methods provided by the registered provider institutions at the merchant point-of-sale locations. For example, in some instances, a registered provider institution may offer to one or more registered merchants the opportunity to borrow funds from the registered provider institution against receivables for one or more payment methods provided by the registered provider institution. That is, in some instances, a registered provider institution may not wish to provide an active discount percentage to customers but may still wish to increase the usage of various payment methods provided by the registered provider institution. Accordingly, by offering one or more registered merchants the opportunity to borrow funds against receivables for the various payment methods provided by the registered provider institution, the registered provider institution may encourage the merchant to offer their own discount offers for the use of the payment methods provided by the registered provider institution.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system comprising:

one or more processing circuits including one or more processors coupled to one or more memory devices, the one or more memory devices having instructions stored thereon that, when executed by the one or more processors, cause the one or more processors to:

receive an indication of a customer attempting to complete a customer transaction using a first potential payment method of a plurality of potential payment methods associated with the customer; and in response to receiving the indication of the customer attempting to complete the customer transaction using the first potential payment method:

place a temporary hold on the customer transaction;

retrieve transaction rates associated with the plurality of potential payment methods, the plurality of potential payment methods comprising a plurality of payment cards associated with the customer, the transaction rates comprising, for one or more payment cards of the plurality of payment cards, at least two of an interchange rate associated the one or more payment cards, an interest rate associated with the one or more payment cards, a rewards rate associated with the one or more payment cards, or a transaction offer associated with the one or more payment cards;

determine an effective transaction rate for the one or more payment cards using the at least two of the interchange rate associated with the one or more payment cards, the interest rate associated with the one or more payment cards, the rewards rate associated with the one or more payment cards, or the transaction offer associated with the one or more payment cards;

determine a plurality of potential transaction amounts corresponding to the plurality of potential payment methods based on the transaction rates, wherein determining at least one potential transaction amount of the plurality of potential transaction amounts is performed using the effective transaction rate;

generate display data including a plurality of payment options, each payment option including an indication of a potential payment method of the plurality of potential payment methods and a potential transaction amount of the plurality of potential transaction amounts corresponding to the potential payment method; and cause a graphical user interface based on the display data to be displayed to the customer.

2. The computing system of claim 1, wherein the indication of the customer attempting to complete the customer transaction using the first potential payment method includes a customer identifier, and the instructions further cause the one or more processors to:

identify the customer based on the customer identifier; and identify the plurality of payment cards associated with the customer.

3. The computing system of claim 1, wherein the rewards rate is a cashback percentage, and the effective transaction rate is determined using the rewards rate and one or more of the interchange rate or a transaction offer associated with each payment card.

4. The computing system of claim 1, wherein retrieving the transaction rates comprises retrieving the interest rate for at least one payment card of the plurality of payment cards, and the interest rate is a real-time value of a variable interest rate.

5. The computing system of claim 1, wherein the instructions further cause the one or more processors to retrieve a real-time balance of one or more accounts associated with the one or more payment cards, and wherein one or more payment options of the plurality of payment options included in the graphical user interface further includes an additional indication of at least one of the interchange rate, the interest rate, the rewards rate, or the real-time balance associated with a corresponding payment card of the one or more payment cards.

6. The computing system of claim 1, wherein causing the graphical user interface to be displayed to the customer comprises displaying the graphical user interface to the customer via a display of a point-of-sale device.

7. The computing system of claim 1, wherein causing the graphical user interface to be displayed to the customer comprises transmitting the display data to a customer device associated with the customer to be displayed to the customer via the customer device.

8. A method comprising:

receiving an indication of a customer attempting to complete a customer transaction using a first potential payment method of a plurality of potential payment methods associated with the customer; and in response to receiving the indication of the customer attempting to complete the customer transaction using the first potential payment method:

placing a temporary hold on the customer transaction;

retrieving transaction rates associated with the plurality of potential payment methods, the plurality of potential payment methods comprising a plurality of payment cards associated with the customer, the transaction rates comprising, for one or more payment cards of the plurality of payment cards, at least two of an interchange rate associated with the one or more payment cards, an interest rate associated with the one or more payment cards, a rewards rate associated with the one or more payment cards, or a transaction offer associated with the one or more payment cards;

determining an effective transaction rate for the one or more payment cards using the at least two of the interchange rate associated with the one or more payment cards, the interest rate associated with the one or more payment cards, the rewards rate associated with the one or more payment cards, or the transaction offer associated with the one or more payment cards;

determining a plurality of potential transaction amounts corresponding to the plurality of potential payment methods based on the transaction rates, wherein determining at least one potential transaction amount of the plurality of potential transaction amounts is performed using the effective transaction rate;

generating display data including a plurality of payment options, each payment option including an indication of a potential payment method of the plurality of potential payment methods and a potential transaction amount of the plurality of potential transaction amounts corresponding to the potential payment method; and causing a graphical user interface based on the display data to be displayed to the customer.

9. The method of claim 8, wherein the indication of the customer attempting to complete the customer transaction using the first potential payment method includes an initial transaction amount corresponding to a purchase price associated with the customer transaction, and wherein each potential transaction amount of the plurality of potential transaction amounts is based on the initial transaction amount and the corresponding transaction rate.

10. The method of claim 8, wherein the indication of the customer attempting to complete the customer transaction using the first potential payment method includes a customer identifier, and the method further comprises:

identifying the customer based on the customer identifier; and identifying the plurality of payment cards associated with the customer.

11. The method of claim 8, wherein the interchange rate is a percentage-based fee applied to the customer transaction by one or more of a card-issuing financial institution, a payment network provider, or a transaction processing entity.

12. The method of claim 8, wherein the plurality of potential payment methods comprise one or more of a cash payment, a debit card payment, a credit card payment, or a financed payment.

13. The method of claim 8, wherein causing the graphical user interface to be displayed to the customer comprises displaying the graphical user interface to the customer via a display of a point-of-sale device.

14. The method of claim 8, wherein causing the graphical user interface to be displayed to the customer comprises transmitting the display data to a customer device associated with the customer to be displayed to the customer via the customer device.

15. The method of claim 8, wherein the indication of the customer attempting to complete the customer transaction using the first potential payment method is received after one or more items being scanned for purchase at a point of sale associated with a merchant.

16. The method of claim 8, wherein the indication of the customer attempting to complete the customer transaction using the first potential payment method is received based on an initiation of an online purchase associated with the customer.

17. A non-transitory computer-readable medium having instructions stored thereon that, when executed by at least one processing circuit of a computing system, cause operations comprising:

receiving an indication of a customer attempting to complete a customer transaction using a first potential payment method of a plurality of potential payment methods associated with the customer; and in response to receiving the indication of the customer attempting to complete the customer transaction using the first potential payment method:

placing a temporary hold on the customer transaction;

retrieving transaction rates associated with the plurality of potential payment methods, the plurality of potential payment methods comprising a plurality of payment cards associated with the customer, the transaction rates comprising, for one or more payment cards of the plurality of payment cards, at least two of an interchange rate associated with the one or more payment cards, an interest rate associated with the one or more payment cards, a rewards rate associated with the one or more payment cards, or a transaction offer associated with the one or more payment cards;

determining an effective transaction rate for the one or more payment cards using the at least two of the interchange rate associated with the one or more payment cards, the interest rate associated with the one or more payment cards, the rewards rate associated with the one or more payment cards, or the transaction offer associated with the one or more payment cards;

determining a plurality of potential transaction amounts corresponding to the plurality of potential payment methods based on the transaction rates, wherein determining at least one potential transaction amount of the plurality of potential transaction amounts is performed using the effective transaction rate;

generating display data including a plurality of payment options, each payment option including an indication of a potential payment method of the plurality of potential payment methods and a potential transaction amount of the plurality of potential transaction amounts corresponding to the potential payment method; and causing a graphical user interface based on the display data to be displayed to the customer.

18. The non-transitory computer-readable medium of claim 17, wherein causing the graphical user interface to be displayed to the customer comprises one of displaying the graphical user interface to the customer via a display of a point-of-sale device or transmitting the display data to a customer device associated with the customer to be displayed to the customer via the customer device.

* * * * *